(12) United States Patent
Zhao et al.

(10) Patent No.: US 11,386,164 B2
(45) Date of Patent: Jul. 12, 2022

(54) SEARCHING ELECTRONIC DOCUMENTS BASED ON EXAMPLE-BASED SEARCH QUERY

(71) Applicants: City University of Hong Kong, Kowloon (HK); The University of Hong Kong, Pokfulam (HK)

(72) Inventors: Jianliang Zhao, Kowloon (HK); Hailiang Chen, Pokfulam (HK); Ruiyun Xu, Kowloon Tong (HK)

(73) Assignees: City University of Hong Kong, Kowloon (HK); The University of Hong Kong, Pok Fu Lam (HK)

( * ) Notice: Subject to any disclaimer, the term of this patent is extended or adjusted under 35 U.S.C. 154(b) by 56 days.

(21) Appl. No.: 15/930,647

(22) Filed: May 13, 2020

(65) Prior Publication Data
US 2021/0357455 A1 Nov. 18, 2021

(51) Int. Cl.
G06F 16/00 (2019.01)
G06F 16/9035 (2019.01)
G06F 16/93 (2019.01)
G06F 16/9032 (2019.01)
G06F 16/903 (2019.01)
(Continued)

(52) U.S. Cl.
CPC ...... *G06F 16/9035* (2019.01); *G06F 16/9038* (2019.01); *G06F 16/90328* (2019.01); *G06F 16/90344* (2019.01); *G06F 16/93* (2019.01)

(58) Field of Classification Search
None
See application file for complete search history.

(56) References Cited

U.S. PATENT DOCUMENTS 5,832,476 A 11/1998 Tada et al.
6,289,342 B1 * 9/2001 Lawrence ............. G06F 16/951
707/999.102

(Continued)

OTHER PUBLICATIONS

Victor Carrera-Trejo et al. "Latent Dirichlet Allocation complement in the vector space model for Multi-Label Text Classification", Jan.-Apr. 2015, International Journal of Combinatorial Optimization Problems and Informatics, vol. 6, No. 1 (Year: 2015).*

(Continued)

*Primary Examiner* — Polina G Peach
(74) *Attorney, Agent, or Firm* — Renner Kenner Greive Bobak Taylor & Weber

(57) ABSTRACT

A computer implemented method for searching electronic documents, and associated system and computer program product. The method includes receiving an input representing an example-based search query and processing the input. The method also includes determining, for each of the electronic documents, a relevance score between the input and the corresponding electronic document. The determination is based on, at least, textual similarity between the input and the corresponding electronic document, topical similarity between the input and the corresponding electronic document, as well as linkage relationship in a linkage network of the plurality of electronic documents. The method also includes determining, based on the determined relevance scores, a search result containing one or more of the electronic documents. The search results will be provided to the user.

19 Claims, 12 Drawing Sheets

(51) Int. Cl.
G06F 16/9038 (2019.01)
G06F 16/30 (2019.01)

(56) References Cited

U.S. PATENT DOCUMENTS

| | | | |
|---|---|---|---|
| 6,829,668 B2 | 12/2004 | Keskar et al. | |
| 6,886,010 B2 | 4/2005 | Kostoff | |
| 7,139,756 B2 | 11/2006 | Cooper et al. | |
| 8,005,806 B2 | 8/2011 | Rupp et al. | |
| 9,189,482 B2 | 11/2015 | Danielyan et al. | |
| 9,286,377 B2 | 3/2016 | Cheslow | |
| 9,626,623 B2* | 4/2017 | Lightner | G06F 40/00 |
| 10,146,862 B2* | 12/2018 | Singhal | G06F 16/35 |
| 10,275,444 B2* | 4/2019 | Bogdan | G06F 16/355 |
| 10,860,631 B1* | 12/2020 | Huang | G06F 16/3334 |
| 11,093,557 B2* | 8/2021 | Gao | G06F 40/30 |
| 2002/0099685 A1 | 7/2002 | Takano | |
| 2003/0014405 A1 | 1/2003 | Shapiro et al. | |
| 2005/0021490 A1* | 1/2005 | Chen | G06F 16/3347 |
| 2006/0212441 A1 | 9/2006 | Tang | |
| 2007/0033221 A1* | 2/2007 | Copperman | G06F 16/367 |
| 2007/0150465 A1* | 6/2007 | Brave | G06F 16/9535 |
| 2008/0077564 A1 | 3/2008 | Hattori | |
| 2011/0213655 A1* | 9/2011 | Henkin | G06Q 30/00 707/E17.061 |
| 2011/0302163 A1* | 12/2011 | Rhinelander | G06F 16/285 707/E17.047 |
| 2013/0036076 A1* | 2/2013 | Yang | G06F 16/313 707/755 |
| 2014/0280166 A1* | 9/2014 | Bryars | G06F 16/245 707/738 |
| 2015/0088906 A1* | 3/2015 | Pal | G06Q 50/01 707/749 |
| 2015/0112683 A1 | 4/2015 | Fujii et al. | |
| 2015/0154305 A1* | 6/2015 | Lightner | G06F 16/951 707/726 |
| 2016/0034512 A1* | 2/2016 | Singhal | G06F 16/35 707/737 |
| 2018/0373754 A1* | 12/2018 | Xu | G06F 16/242 |

OTHER PUBLICATIONS

Istvan Biro, Jacint Szabo "Large scale link based latent Dirichlet allocation for web document classification", 2018, *Data Mining and Web search Research Group, Informatics Laboratory, Computerand Automation Research Institute of the Hungarian Academy of Sciences (Year: 2018).*

Arazy, O., and Woo, C. 2007. "Enhancing Information Retrieval through Statistical Natural Language Processing: A study of Collocation Indexing," MIS Quarterly (31:3), pp. 525-546.
Bethard S, and Jurafsky D (2010) Who Should I Cite: Learning Literature Search Models from Citation Behavior. Proceedings of the 19th ACM International Conference on Information and Knowledge Management.
Browne G J, Mitzi G P, James C W (2007) Cognitive stopping rules for terminating information search in online tasks. MIS Quart. 31(1): 89-104.
Brin S, Page L (1998) The anatomy of a large-scale hypertextual web search engine. Comput. Networks and ISDN Systems 30: 107-117.
Chen, Y., and Zhang, Y. Q. 2009. "A Query Substitution-Search Result Refinement Approach for Long Query Web Searches," in The IEEE/WIC/ACM International Joint Conference on Web Intelligence and Intelligent Agent Technologies (1), pp. 245-251. IEEE.
Ganguly, D., Leveling, J., Magdy, W., and Jones, G. J. 2011. "Patent Query Reduction using Pseudo Relevance Feedback," in Proceedings of the 20th ACM International Conference on Information and Knowledge Management, pp. 953-1956.
Lin, J., and Wilbur, W. J. 2007. "PubMed Related Articles: A Probabilistic Topic-based Model for Content Similarity," BMC Bioinformatics (8:1), pp. 423 (doi:10.1186/1471-2105-8-423).
Ponte, J. M., and Croft, W. B. 1998. "A Language Modeling Approach to Information Retrieval," in Proceedings of the 21st Annual International ACM SIGIR Conference on Research and Development in Information Retrieval, pp. 275-281.
Nei C P, Hu P J H, Tai C H, Huang C N, Yang C S (2007) Managing word mismatch problems in information retrieval: A topic-based query expansion approach. J. of Management Inform. Systems 24(3):269-295.
Storey, V. C., Burton-Jones, A., Sugumaran, V., and Purao, S. 2008. "CONQUER: Methodology for Context-Aware Query Processing on the World Wide Web," Information Systems Research (19:1), pp. 3-25.
Strohman, T., Croft, W. B., and Jensen, D. 2007. "Recommending Citations for Academic Papers," in Proceedings of the 30th Annual International ACM SIGIR Conference on Research and Development in Information Retrieval, pp. 705-706.
Sweller J (1988) Cognitive load during problem solving: Effects on learning. Cognitive Sci. 12(2):257-285.
Page, L., Brin, S., Motwani, R., and Winograd, T. 1999. "The PageRank Citation Ranking: Bringing Order to the Web," Stanford InfoLab.
Pirolli P, Card S (1999) Information foraging. Psych. Rev. 106(4): 643-675.

* cited by examiner

1. Inputs: Query $q$, a pre-calculated $tf$-$idf$ vector $D_{tf-idf}$ for each document $d$ in the collection; a pre-calculated *topic-distribution* vector for each document $d$ in the collection $D_{lda}$; Citation network $C_{N,N}$ for the $N$ documents in the collection.
2. Outputs: Top $X$ retrieved documents.
3. Parameters: Pre-estimated coefficients $\alpha, \beta, \gamma$ from the logistic regression for *TextSimilarity*, *TopicalSimilarity* and *CrowdRank*, respectively.
4. for each query $q$
5. | Calculate the $tf$-$idf$ vector $Q_{tf-idf}$ given the pre-defined vocabulary;
6. | Infer the topical distribution $Q_{lda}$ for $q$ using the LDA model;
7. | for each document $d$ in the collection
8. | | Compute the text similarity between $q$ and $d$ using $TextSimilarity_{qd} = \frac{Q_{tf-idf} \cdot D_{tf-idf}}{|Q_{tf-idf}||D_{tf-idf}|}$;
9. | | Compute the topical similarity between $q$ and $d$ using $TopicalSimilarity_{qd} = \frac{Q_{lda} \cdot D_{lda}}{|Q_{lda}||D_{lda}|}$;
10. | end for
11. | for each document $d$ in the collection
13. | | Compute the *CrowdRank* measure between $q$ and $d$ using $CrowdRank_{qd} = \frac{\sum_{i}^{N-1} TopicalSimilarity_{qi} \cdot C_{id}}{1 + \ln(1 + LinkCount_d)}$;
14. | | Calculate the relevance score between $q$ and $d$ using $\alpha \times \ln(TextSimilarity_{qd}) + \beta \times \ln(TopicalSimilarity_{qd}) + \gamma \times \ln(CrowdRank_{qd})$
15. | end for
16. | Sort all documents by relevance score in a descending order;
17. | Return top $X$ documents;
18. | Wait for next search request from users;
19. end for

Title: Capturing the Complexity of Malleable IT Use: Adaptive Structuration Theory for Individuals

Publication Year: 2016

Abstract: The confluence of widely available malleable technology and the "bring your own device" (BYOD) trend creates a new dynamic for information technology innovation in the workplace. Nontechnical users are empowered to adapt pliable technology in the course of normal usage episodes. We develop a theoretical perspective of adaptation behaviors by extending the adaptive structuration theory (AST) to the level of individuals, and present a topology of adaptation behaviors to capture the rich landscape of this emerging phenomenon. Based on this new theoretical perspective, we propose a research model and perform a survey study targeting young professionals to empirically investigate adaptation of malleable IT by users. Our findings reveal the compounding effects of four distinct adaptation behaviors including the insight that task adaptation mediates the effect of technology adaptation on individual performance. This study contributes by providing a theoretical framework for examining adaptation behaviors, extending AST to the level of individuals, and addressing specific criticisms of AST in the information systems literature.

Figure 9

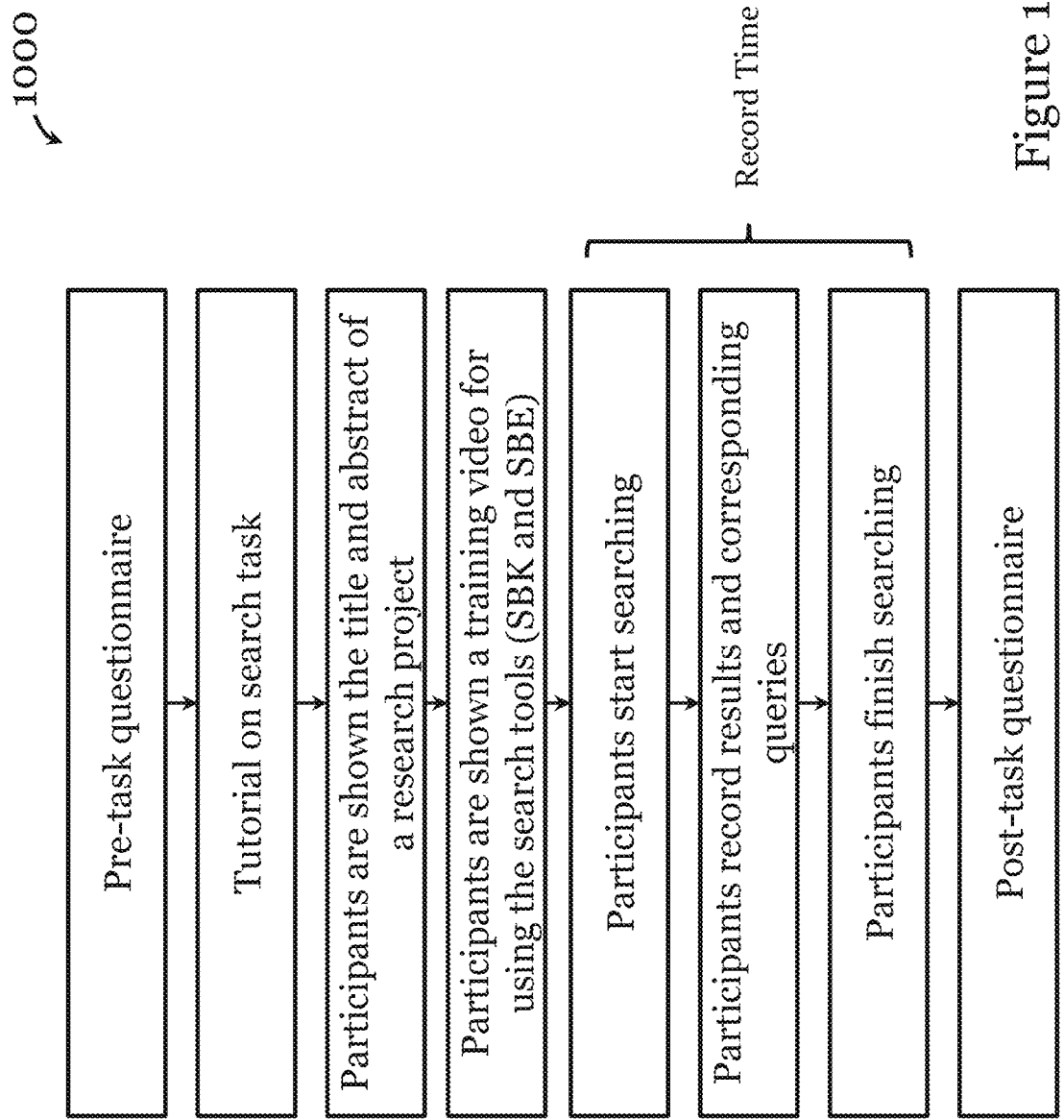

SEARCHING ELECTRONIC DOCUMENTS BASED ON EXAMPLE-BASED SEARCH QUERY

TECHNICAL FIELD

The invention concerns searching electronic documents based on an example-based search query. The invention relates to, among other things, a method, a system, and a computer program product associated with searching electronic documents based on an example-based search query.

BACKGROUND

Search engines have become an indispensable tool for searching electronic resources such as electronic documents, e.g., in the Internet. Existing search engines, such as Google and Bing, basically use Search by keyword (SBK) search paradigm, which requires users to submit queries using keyword(s) via a trial-and-error process.

FIG. 1 illustrates an exemplary method 100 implemented using SBK. In step 102, the user first inputs the keyword(s) of which he/she thinks may be most relevant to the search query. After receiving this input, the method then proceeds to process the keyword(s) and applies search algorithm to locate relevant search results, as in step 104. Then, in step 106, the interim search results are provided to the user. Upon receiving the search results, the user then browses, evaluates, compares, etc., the results in step 108, and determines if the results meet his/her need, in step 110. If the user is not satisfied with the result, he/she may repeat the process too by trying other keyword(s) back in step 102. Otherwise, if the user is satisfied with the result, the search ends in step 112.

SBK can be quite effective in applications in which the precise search term(s) are known, unambiguous, and/or easy to find. However, in some applications, such as patent search and literature search, SBK may be inadequate in describing information need accurately, and so can be painstakingly iterative and hence ineffective, and leads to low search productivity.

There is a need to provide an improved or alternative method for searching electronic resources such as electronic documents.

SUMMARY OF THE INVENTION

In accordance with a first aspect of the invention, there is provided a computer implemented method for searching electronic documents. The method includes receiving, e.g., from a user, an input representing an example-based search query, and processing the input. The method also includes determining, for each of the plurality of electronic documents, a relevance score between the input and the corresponding electronic document. The determination is based on (i) textual similarity between the input and the corresponding electronic document, (ii) topical similarity between the input and the corresponding electronic document, and (iii) linkage relationship in a linkage network of the plurality of electronic documents. The method further includes determining, based on the determined relevance scores, a search result to be provided to the user. The search result contains one or more of the plurality of electronic documents.

In one embodiment of the first aspect, the computer implemented method also includes determining, for each of the plurality of electronic documents, a textual similarity score between the input and the corresponding electronic document.

In one embodiment of the first aspect, the computer implemented method also includes determining, for each of the plurality of electronic documents, a topical similarity score between the input and the corresponding electronic document.

In one embodiment of the first aspect, the computer implemented method also includes determining, for each of the plurality of electronic documents, a topical based linkage score between the input and the corresponding electronic document based on the determined topical similarity scores and linkage relationship in the linkage network.

In one embodiment of the first aspect, the relevance score between the input and the corresponding electronic document is determined based on the corresponding determined textual similarity score, the corresponding determined topical similarity score, and the corresponding determined topical based linkage score.

In one embodiment of the first aspect, the input includes a string of text. The string of text is formed by multiple texts. Depending on embodiments, text may refer to text unit, such as word (including mis-spelled word), abbreviation, etc. In some cases, the input may include non-text elements, which may be discarded or otherwise ignored.

In one embodiment of the first aspect, the input includes one or more clauses, sentences, or paragraphs of text. The text can be in different "format" (fonts, size, emphasis, etc.).

In one embodiment of the first aspect, receiving the input includes: receiving an electronic document file, and processing the electronic document file to extract text content from the received electronic document file so as to use the extracted text content as the input.

In one embodiment of the first aspect, processing the input includes identifying one or more text from the input; and determining a weighting factor for each of the one or more identified text.

In one embodiment of the first aspect, the identification is based on comparing the input with a text database to identify one or more text in the input contained in the text database. The text database may include at least one, only some, or all of the text in the input.

In one embodiment of the first aspect, the weighting factor is a term frequency-inverse document frequency factor determined based on the input and the plurality of electronic documents.

In one embodiment of the first aspect, the term frequency-inverse document frequency factor for each term is determined based on $$tf_{t,d} \times \log\left(\frac{N}{df_t}\right)$$

where $tf_{t,d}$ is the frequency of term t in the input d, N is the total number of the electronic documents, $df_t$ is the number of the electronic documents containing the term t. In other embodiments of the first aspect, the term frequency-inverse document frequency factor for each term is determined based on a different equation/expression that provides a different weighting scheme.

In one embodiment of the first aspect, processing the input includes quantizing the input as a textural vector $Q_{tf\text{-}idf}$ based on the one or more determined weighting factors.

In one embodiment of the first aspect, the textual similarity score between the input and the corresponding electronic document is determined based on $$\frac{Q_{tf-idf} \cdot D_{tf-idf}}{|Q_{tf-idf}||D_{tf-idf}|}$$

where $Q_{tf-idf}$ represents textural vector of the input and $D_{tf-idf}$ represents textural vector of the corresponding electronic document.

In one embodiment of the first aspect, processing the input includes determining, using a topic modelling method, a topical distribution associated with the input.

In one embodiment of the first aspect, the topic modelling method is based on a Latent Dirichlet Allocation model.

In one embodiment of the first aspect, determining the topical distribution associated with the input includes quantizing the topical distribution associated with the input as a topical vector $Q_{lda}$.

In one embodiment of the first aspect, the topical similarity score between the input and the corresponding electronic document is determined based on $$\frac{Q_{lda} \cdot D_{lda}}{|Q_{lda}||D_{lda}|}$$

where $Q_{lda}$ represents topical vector of the input and $D_{lda}$ represents topical vector of the corresponding electronic document.

In one embodiment of the first aspect, the topical based linkage score between the input and the corresponding electronic document is determined based on $$\frac{\sum_{i}^{N-1} TopicalSimilarity_{qi} \cdot c_{id}}{1 + \ln(1 + LinkCount_d)}$$

where i is an electronic document in the plurality of electronic documents except a focal electronic document d of which the topical based linkage score is to be calculated, $c_{id}$ is a binary variable that denotes a link from electronic document i to electronic document d, $TopicalSimilarity_{qi}$ is the topical similarity score between the input and the electronic document i, N is the total number of electronic document, $LinkCount_d$ is the number of incoming links to electronic document d.

In one embodiment of the first aspect, the relevance score between the input and the corresponding electronic document is determined based on $$\alpha \times \ln(TextSimilarity_{qd}) + \beta \times \ln(TopicalSimilarity_{qd}) + \gamma \times \ln(CrowdRank_{qd})$$

where $\alpha, \beta, \gamma$ are coefficients, $TextSimilarity_{qd}$ represents the corresponding determined textual similarity score, $TopicalSimilarity_{qd}$ represents the corresponding determined topical similarity score, and $CrowdRank_{qd}$ represents the corresponding determined topical based linkage score. $\alpha, \beta, \gamma$ may be predetermined constants. $\alpha, \beta, \gamma$ may be selected or determined by the user.

In one embodiment of the first aspect, the plurality of electronic documents define the linkage network in which at least one of the electronic documents is a linked document being linked to by one or more of the other electronic documents, and at least one of the electronic documents is a linking document including a link to one or more of the other electronic documents.

In one embodiment of the first aspect, the plurality of electronic documents define the linkage network in which at least one of the electronic documents is a linked document being linked to by one or more of the other electronic documents, at least one of the electronic documents is a linking document including a link to one or more of the other electronic documents, and at least one of the electronic documents is both a linked document being linked to by one or more of the other electronic documents and a linking document including a link to one or more of the other electronic documents.

In one embodiment of the first aspect, determining the search result includes sorting the plurality of electronic documents based on the determined relevance scores. The sorting may be arranged in a descending order of the determined relevance scores (i.e., most relevant first).

In one embodiment of the first aspect, the computer implemented method further includes providing the search result to the user. Providing the search result to the user may include displaying the search result to the user, e.g., via a display screen. The search result may be displayed in a descending order of the determined relevance scores.

In one embodiment of the first aspect, determining the search result includes comparing the plurality of determined relevance scores with a threshold relevance score; and identifying, based on the comparison, one or more electronic documents having respective determined relevance score higher than the threshold relevance score for inclusion in the search result. The other results are not displayed or otherwise provided to the user.

In one embodiment of the first aspect, determining the search result includes identifying, from the plurality of electronic documents, a predetermined number of the electronic documents with the highest determined relevance scores for inclusion in the search result. The predetermined number may be specified by the user, or fixed.

In accordance with a second aspect of the invention, there is provided a non-transitory computer readable medium storing computer instructions that, when executed by one or more processors, are arranged to cause the one or more processors to perform the method of the first aspect. The one or more processors may be arranged in the same computing device or may be distributed in multiple computing devices.

In accordance with a third aspect of the invention, there is provided an article including the computer readable medium of the second aspect.

In accordance with a fourth aspect of the invention, there is provided a computer program product storing instructions and/or data that are executable by one or more processors, the instructions and/or data are arranged to cause the one or more processors to perform the method of the first aspect.

In accordance with a fifth aspect of the invention, there is provided a system for searching electronic documents. The system includes one or more processors arranged to: receive an input representing an example-based search query; process the input; and determine, for each of the plurality of electronic documents, a relevance score between the input and the corresponding electronic document. The determination is based on (i) textual similarity between the input and the corresponding electronic document, (ii) topical similarity between the input and the corresponding electronic document, and (iii) linkage relationship in a linkage network of the plurality of electronic documents. The one or more processors are also arranged to determine, based on the determined relevance scores, a search result to be provided to the user. The search result contains one or more of the plurality of electronic documents. The one or more processors may be arranged in the same computing device or may be distributed in multiple computing devices. The input may be received from an input device, e.g., via a network.

In one embodiment of the fifth aspect, the one or more processors are further arranged to: (i) determine, for each of the plurality of electronic documents, a textual similarity score between the input and the corresponding electronic document; (ii) determine, for each of the plurality of electronic documents, a topical similarity score between the input and the corresponding electronic document; and/or (iii) determine, for each of the plurality of electronic documents, a topical based linkage score between the input and the corresponding electronic document based on the determined topical similarity scores and linkage relationship in the linkage network.

In one embodiment of the fifth aspect, the relevance score between the input and the corresponding electronic document is determined based on the corresponding determined textual similarity score, the corresponding determined topical similarity score, and the corresponding determined topical based linkage score.

In one embodiment of the fifth aspect, the input includes a string of text. The string of text is formed by multiple texts. Depending on embodiments, text may refer to text unit, such as word (including mis-spelled word), abbreviation, etc. In some cases, the input may include non-text elements, which may be discarded or otherwise ignored.

In one embodiment of the fifth aspect, the input includes one or more clauses, sentences, or paragraphs of text. The text can be in different "format" (fonts, size, emphasis, etc.).

In one embodiment of the fifth aspect, the one or more processors are arranged to receive the input by, at least, receiving an electronic document file, and processing the electronic document file to extract text content from the received electronic document file so as to use the extracted text content as the input.

In one embodiment of the fifth aspect, the one or more processors are arranged to process the input by, at least, identifying one or more text from the input; and determining a weighting factor for each of the one or more identified text.

In one embodiment of the fifth aspect, the identification is based on comparing the input with a text database to identify one or more text in the input contained in the text database. The text database may include at least one, only some, or all of the text in the input.

In one embodiment of the fifth aspect, the weighting factor is a term frequency-inverse document frequency factor determined based on the input and the plurality of electronic documents.

In one embodiment of the fifth aspect, the term frequency-inverse document frequency factor for each term is determined based on $$tf_{t,d} \times \log\left(\frac{N}{df_t}\right)$$

where $tf_{t,d}$ is the frequency of term t in the input d, N is the total number of the electronic documents, $df_t$ is the number of the electronic documents containing the term t. In other embodiments of the fifth aspect, the term frequency-inverse document frequency factor for each term is determined based on a different equation/expression that provides a different weighting scheme.

In one embodiment of the fifth aspect, the one or more processors are arranged to process the input by, at least, quantizing the input as a textural vector $Q_{tf\text{-}idf}$ based on the one or more determined weighting factors.

In one embodiment of the fifth aspect, the textual similarity score between the input and the corresponding electronic document is determined based on $$\frac{Q_{tf\text{-}idf} \cdot D_{tf\text{-}idf}}{|Q_{tf\text{-}idf}||D_{tf\text{-}idf}|}$$

where $Q_{tf\text{-}idf}$ represents textural vector of the input and $D_{tf\text{-}idf}$ represents textural vector of the corresponding electronic document.

In one embodiment of the fifth aspect, the one or more processors are arranged to process the input by, at least, determining, using a topic modelling method, a topical distribution associated with the input.

In one embodiment of the fifth aspect, the topic modelling method is based on a Latent Dirichlet Allocation model.

In one embodiment of the fifth aspect, the one or more processors are arranged to determine the topical distribution associated with the input by, at least, quantizing the topical distribution associated with the input as a topical vector $Q_{lda}$.

In one embodiment of the fifth aspect, the topical similarity score between the input and the corresponding electronic document is determined based on $$\frac{Q_{lda} \cdot D_{lda}}{|Q_{lda}||D_{lda}|}$$

where $Q_{lda}$ represents topical vector of the input and $D_{lda}$ represents topical vector of the corresponding electronic document.

In one embodiment of the fifth aspect, the topical based linkage score between the input and the corresponding electronic document is determined based on $$\frac{\sum_{i}^{N-1} TopicalSimilarity_{qi} \cdot c_{id}}{1 + \ln(1 + LinkCount_d)}$$

where i is an electronic document in the plurality of electronic documents except a focal electronic document d of which the topical based linkage score is to be calculated, $C_{id}$ is a binary variable that denotes a link from electronic document i to electronic document d, $TopicalSimilarity_{qi}$ is the topical similarity score between the input and the electronic document i, N is the total number of electronic document, $LinkCount_d$ is the number of incoming links to electronic document d.

In one embodiment of the fifth aspect, the relevance score between the input and the corresponding electronic document is determined based on $$\alpha \times \ln(TextSimilarity_{qd}) + \beta \times \ln(TopicalSimilarity_{qd}) + \gamma \times \ln(CrowdRank_{qd})$$

where α, β, γ are coefficients, $\text{TextSimilarity}_{qd}$ represents the corresponding determined textual similarity score, $\text{TopicalSimilarity}_{qd}$ represents the corresponding determined topical similarity score, and $\text{CrowdRank}_{qd}$ represents the corresponding determined topical based linkage score. α, β, γ may be predetermined constants. α, β, γ may be selected or determined by the user.

In one embodiment of the fifth aspect, the plurality of electronic documents define the linkage network in which at least one of the electronic documents is a linked document being linked to by one or more of the other electronic documents, and at least one of the electronic documents is a linking document including a link to one or more of the other electronic documents.

In one embodiment of the fifth aspect, the plurality of electronic documents define the linkage network in which at least one of the electronic documents is a linked document being linked to by one or more of the other electronic documents, at least one of the electronic documents is a linking document including a link to one or more of the other electronic documents, and at least one of the electronic documents is both a linked document being linked to by one or more of the other electronic documents and a linking document including a link to one or more of the other electronic documents.

In one embodiment of the fifth aspect, the one or more processors are arranged to determine the search result by, at least, sorting the plurality of electronic documents based on the determined relevance scores. The sorting may be arranged in a descending order of the determined relevance scores (i.e., most relevant first).

In one embodiment of the fifth aspect, the one or more processors are further arranged to provide the search result to the user. Providing the search result to the user may include providing the search result to the user, e.g., via an output device, e.g., operably connected with the one or more processors. The output device may be one or more of: a display screen/monitor/panel/system, a speaker, a printer, a projector, etc., arranged to provide the search results to the user via corresponding means. The search result may be displayed in a descending order of the determined relevance scores.

In one embodiment of the fifth aspect, the one or more processors are arranged to determine the search result by, at least, comparing the plurality of determined relevance scores with a threshold relevance score; and identifying, based on the comparison, one or more electronic documents having respective determined relevance score higher than the threshold relevance score for inclusion in the search result. The other results are not displayed or otherwise provided to the user.

In one embodiment of the fifth aspect, the one or more processors are arranged to determine the search result by, at least, identifying, from the plurality of electronic documents, a predetermined number of the electronic documents with the highest determined relevance scores for inclusion in the search result. The predetermined number may be specified by the user, or fixed.

BRIEF DESCRIPTION OF THE DRAWINGS

Embodiments of the invention will now be described, by way of example, with reference to the accompanying drawings in which:

FIG. 6 illustrates an implementation of the method of FIG. 4 in one embodiment of the invention;

FIG. 7 is a screenshot of a tool that enables searching of electronic documents using keyword-based query;

FIG. 9 is an abstract of a scientific document used for a search experiment performed using the tools illustrated in FIGS. 7 and 8;

FIG. 10 is a flowchart showing a process of the search experiment of FIG. 9;

DETAILED DESCRIPTION

Figure 2:
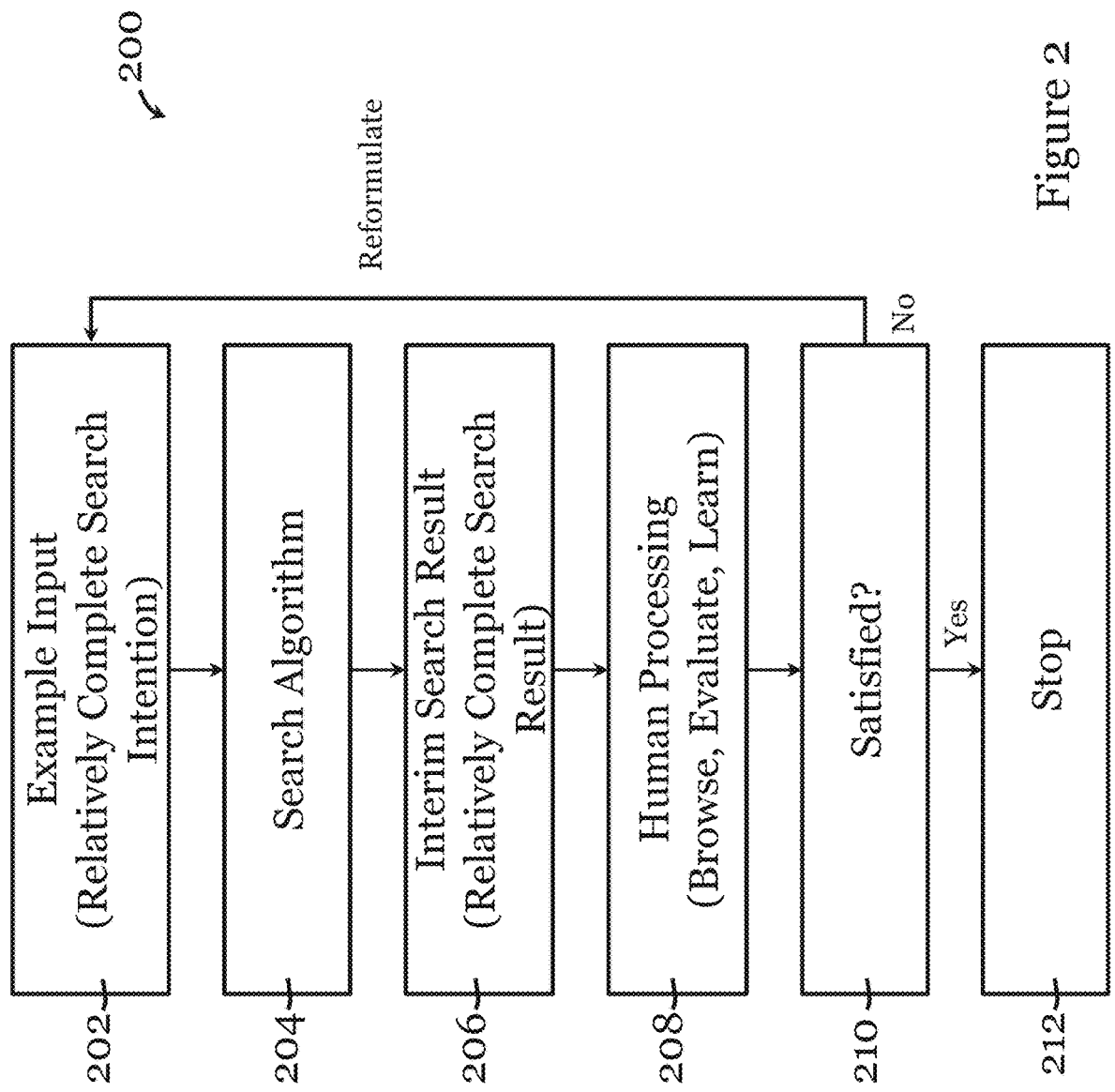
FIG. 2 is a flowchart showing a general process of searching of electronic documents using example-based query in one embodiment of the invention.

FIG. 2 illustrates a general method 200 of searching of electronic documents using example-based query in one embodiment of the invention. The method 200 begins in step 202, in which the user first inputs an example relevant to the search query. The example includes a string of text (e.g., formed by multiple text units, such as words (including misspelled words), abbreviations, etc. The string of texts may form clauses, sentences, or even paragraphs. In some cases, the example could be a patent abstract, a research abstract, a full article, a product description, etc. The example can be in any format, including plain text, electronic document file, etc. The example represents a relatively detailed or complete search intention of the user. After receiving this input example, the method 200 then proceeds to process it and applies search algorithm to locate relevant search results, as in step 204. Then, in step 206, the interim search results are provided to the user. Upon receiving the search results, the user then browses, evaluates, etc., the results in step 208, and determines if the results meet his/her need, in step 210. If the user is not satisfied with the result, he/she may repeat the process 200 by modifying the example or even replacing the example with a new one, going back in step 202. Otherwise, if the user is satisfied with the result, the search ends in step 212.

As can be seen, the fundamental difference between the method 200 in one embodiment of the invention and the existing method 100 is in the input used for searching. In method 100 the input used is keyword(s) (e.g., disjointed, unrelated word(s)) while in method 200 the input used is an example (e.g., sentence(s), phrase(s)). Because of this difference in input, methods 100 and 200 use very different search algorithms for processing the input for identifying the search results. Details of the search algorithm of method 200, i.e., method of searching of electronic documents using example-based query, will be provided below.

Figure 3:
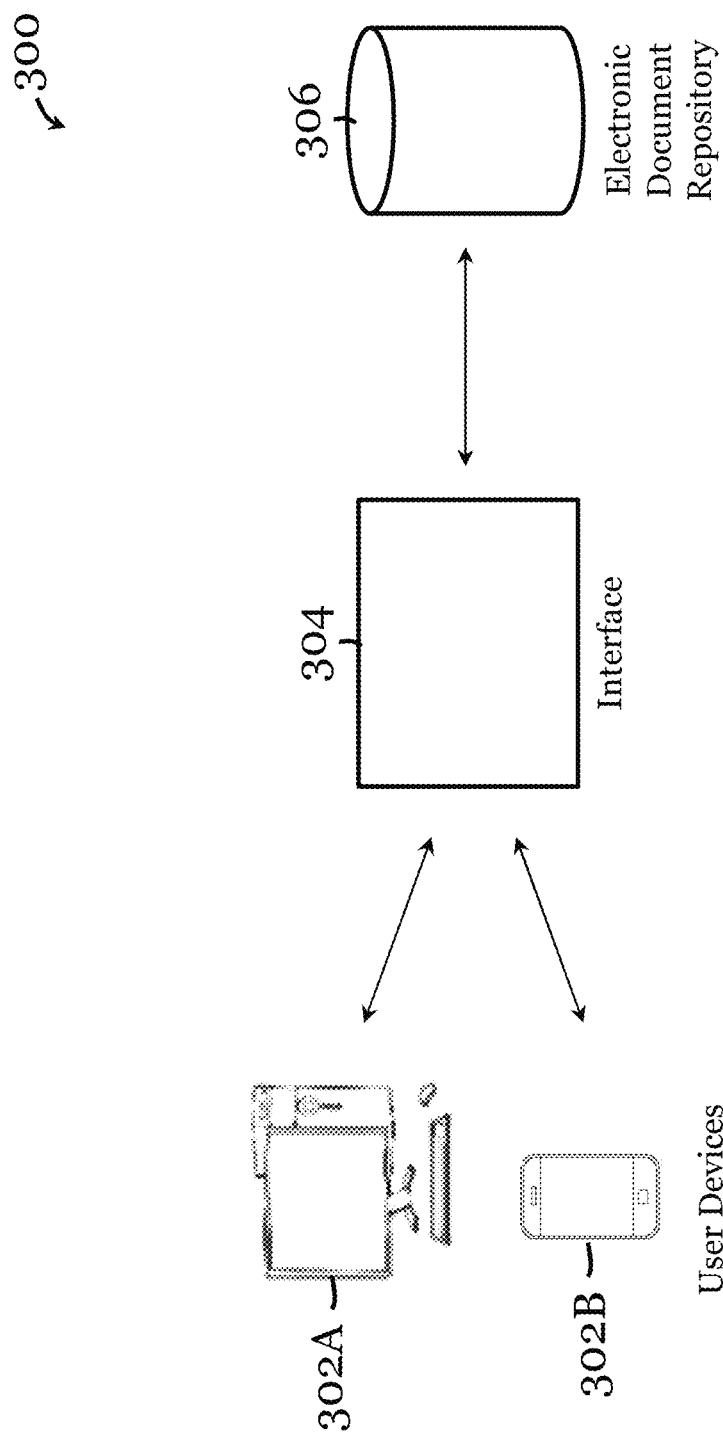
FIG. 3 is a schematic diagram of a system in which a method of searching of electronic documents using example-based query in one embodiment of the invention can be performed.

FIG. 3 shows an exemplary system 300 in which a method of searching of electronic documents using example-based query can be implemented. The system 300 includes any number of user devices 302A, 302B connectable to an electronic document repository 306 via an interface 304. In this example, the user devices 302A is a computer and the user device 302B is a smart phone or tablet computer. The interface 304 may be an application, a webpage, a web application, or the like, that provides a user interface for searching. The electronic document repository 306 is basically a database that stores electronic documents. The electronic document repository 306 can be updated with new electronic documents. The electronic document repository 306 can be provided by one or more servers operably connected with each other, arranged in the same or different location or premises. The one or more servers may be arranged in a cloud computing arrangement. Alternatively, the electronic document repository 306 may be at least partly, or completely, integrated or stored in the user devices 302A, 302B. Communication links existing between the user devices 302A, 302B and the interface 304, and between the interface 304 and the electronic document repository 306, may be wired or wireless. With the system 300, the user can search the electronic documents in the electronic document repository 306 via the interface 304 using the user devices 302A, 302B.

Figure 4:
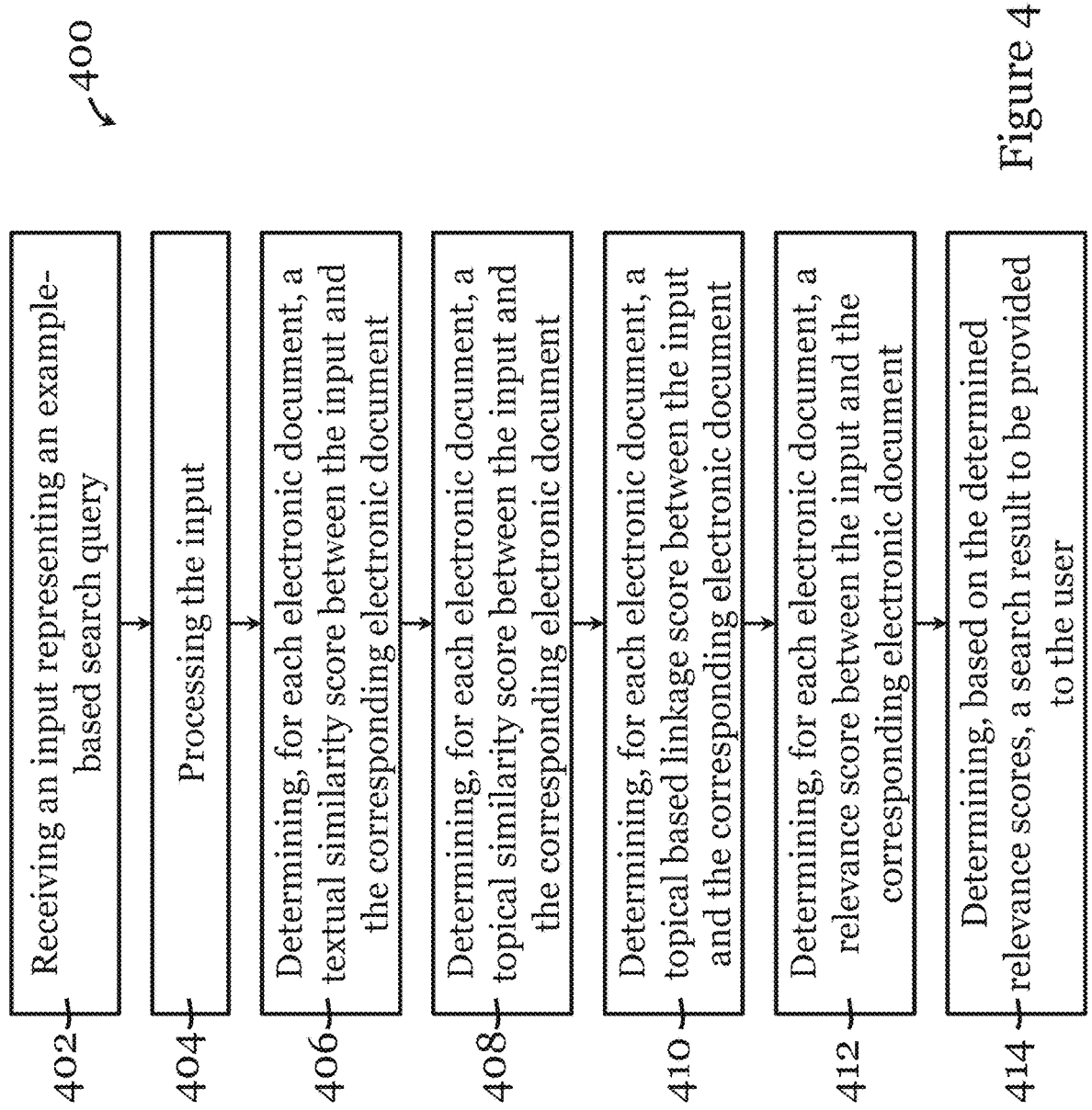
FIG. 4 is a flowchart showing a method of searching of electronic documents using example-based query in one embodiment of the invention.

FIG. 4 is a method 400 for searching electronic documents. The order of steps in method 400 can be different from that illustrated, as long as the order is sensible and technically feasible.

The method 400 begins in step 402, which includes receiving an input representing an example-based search query. The input includes a string of text, which may be formed by multiple text units, such as words (including mis-spelled words), abbreviations, etc. Non text based input may be discarded or otherwise ignored. The example-based input may include one or more clauses, sentences, or paragraphs of text. The input can be in the form of plain text inputted by the user, or in the form of a text file (e.g., word file, pdf file). In one example in which the input is a text file, then step 402 may include receiving the electronic document file, and processing the electronic document file to extract text content from the received electronic document file so as to use the extracted text content as the input.

The method then proceeds to step 404 to process the input. In this regard, step 404 may include identifying one or more text from the input and determining a weighting factor for each of the one or more identified text. The identification may be based on comparing the input with a predetermined text database (e.g., vocabulary repository) to identify text in the input contained in the text database. The text database may not necessarily include all of the text in the input, in which case those texts may be ignored. The weighting factor may be a term frequency-inverse document frequency (TF-IDF) factor determined based on the input and the electronic documents. In one example, the term frequency-inverse document frequency factor for each term is determined based on $$tf_{t,d} \times \log\left(\frac{N}{df_t}\right)$$

where $tf_{t,d}$ is the frequency of term t in the input d, N is the total number of the electronic documents, $df_t$ is the number of the electronic documents containing the term t. In other embodiments of the first aspect, the term frequency-inverse document frequency factor for each term is determined based on a different equation/expression that provides a different weighting scheme. The input may be quantized as a textural vector $Q_{tf\text{-}idf}$ based on the one or more determined weighting factors.

Additionally or alternatively, step 404 may include determining, using a topic modelling method, a topical distribution associated with the input. The topic modelling method is based on a Latent Dirichlet Allocation model. Details of the Latent Dirichlet Allocation model can be found in Blei, D. M., Ng, A. Y., and Jordan, M. I. 2003. *"Latent Dirichlet Allocation," Journal of Machine Learning Research* (3), pp. 993-1022, and so is not described in detail here. The determination of topical distribution associated with the input may include quantizing the topical distribution associated with the input as a topical vector $Q_{lda}$.

After processing the input in step 404, in step 406, the method 400 determines, for each electronic document, a textual similarity score between the input and the corresponding electronic document. In one example, the textual similarity score between the input and the corresponding electronic document is determined based on $$\frac{Q_{tf\text{-}idf} \cdot D_{tf\text{-}idf}}{|Q_{tf\text{-}idf}||D_{tf\text{-}idf}|}$$

where $Q_{tf\text{-}idf}$ represents textural vector of the input and $D_{tf\text{-}idf}$ represents textural vector of the corresponding electronic document.

In step 408, the method 400 also determines, for each of the electronic documents, a topical similarity score between the input and the corresponding electronic document. In one example, the topical similarity score between the input and the corresponding electronic document is determined based on $$\frac{Q_{lda} \cdot D_{lda}}{|Q_{lda}||D_{lda}|}$$

where $Q_{lda}$ represents topical vector of the input and $D_{lda}$ represents topical vector of the corresponding electronic document. The inclusion of topical similarity into the method 400 or search algorithm may improve the search performance.

In step 410, the method 400 also determines for each of the electronic documents, a topical based linkage score between the input and the corresponding electronic document based on the determined topical similarity scores and linkage relationship in the linkage network. In one example, the topical based linkage score between the input and the corresponding electronic document is determined based on $$\frac{\sum_{i}^{N-1} TopicalSimilarity_{qi} \cdot c_{id}}{1 + \ln(1 + LinkCount_d)}$$

where i is an electronic document in the plurality of electronic documents except a focal electronic document d of which the topical based linkage score is to be calculated, $C_{id}$ is a binary variable that denotes a link from electronic document i to electronic document d, $TopicalSimilarity_{qi}$ is the topical similarity score between the input and the electronic document i, N is the total number of electronic document, $LinkCount_d$ is the number of incoming links to electronic document d. The plurality of electronic documents may define the linkage network in which at least one of the electronic documents is a linked document being linked to by (e.g., referred to by) at least one other electronic documents, at least one of the electronic documents is a linking document including a link to (e.g., refers to) at least one other electronic documents. Optionally at least one of the electronic documents is both a linked document being linked to by at least one other electronic documents and a linking document including a link to at least one other electronic documents. Essentially, in this step 410, higher weight is given to the link of topically similar electronic documents so as to organically combine the textual information with link structure by utilizing the additional information embedded in the example (i.e., the input).

Then, in step 412, the method 400 determines, for each of the plurality of electronic documents, a relevance score between the input and the corresponding electronic document based on (i) textual similarity between the input and the corresponding electronic document, (ii) topical similarity between the input and the corresponding electronic document, and (iii) linkage relationship in a linkage network of the plurality of electronic documents. In one implementation, the relevance score between the input and the corresponding electronic document is determined based on the corresponding determined textual similarity score, the corresponding determined topical similarity score, and the corresponding determined topical based linkage score obtained in steps 406-410. In one example, the relevance score between the input and the corresponding electronic document is determined based on $$\alpha \times \ln(TextSimilarity_{qd}) + \beta \times \ln(TopicalSimilarity_{qd}) + \gamma \times \ln(CrowdRank_{qd})$$

where $\alpha$, $\beta$, $\gamma$ are coefficients, $TextSimilarity_{qd}$ represents the corresponding determined textual similarity score, $TopicalSimilarity_{qd}$ represents the corresponding determined topical similarity score, and $CrowdRank_{qd}$ represents the corresponding determined topical based linkage score. $\alpha$, $\beta$, $\gamma$ may be predetermined constants and may be selected or determined by the user.

Finally, in step 414, the method 400 determines, based on the determined relevance scores, a search result to be provided to the user. The search result contains one or more of the electronic documents. The determination of the search results may include sorting the electronic documents based on the determined relevance scores. The sorting may be arranged in a descending order of the determined relevance scores (i.e., most relevant first). In one example, if the determined relevance scores for two or more electronic documents are identical, then the sorting may be based on alphabetical order of the title, the first author, the file size, the popularity, etc., of the electronic document. In some cases, the sorting may be in an ascending order. The determination of the search result may include comparing the determined relevance scores with a threshold relevance score; and identifying, based on the comparison, one or more electronic documents having respective determined relevance score higher than the threshold relevance score for inclusion in the search result. Or, the determination of the search result may include identifying, from the electronic documents, a predetermined number of the electronic documents with the highest determined relevance scores for inclusion in the search result. The predetermined number may be specified by the user, or fixed. For example, the number is 10 and the search results will include the 10 most relevant electronic document (10 highest determined relevance scores). The other results are not displayed or otherwise provided to the user.

In one implementation, the method 400 also includes providing, e.g., displaying, the search result to the user. The search result may be displayed in a descending order of the determined relevance scores.

A specific, non-limiting implementation of a search method based on search by example (SBE) is provided below.

Conceptual Framework

The paradigm of SBE can be conceptually defined in terms of query input, query formulation tactics, search process, and application scopes. SBE takes an example as a search query input, which is not constrained by length (e.g., ranging from a few sentences to a full document). Compared to the use of keyword(s), as in the existing SBK method, the use of an example as an input would require higher composing cost but would be more effective in describing complex and ambiguous information needs.

In order for the user to formulate a valid example, i.e., an example that is best used with the SBE method, there can be four tactics, namely specification, expansion, reduction, and substitution. Specification is to specify an example to represent searcher's information needs in detail. To compose an initial example-based query, searchers can either utilize the readily available materials at hand such as a new patent application or seek for expert advice on the searched topic. For instance, research students can solicit suggestions from their supervisors before exploring a research topic. The starter documents recommended by supervisors can be directly used as query input under SBE. Expansion refers to enriching the initial example by including additional information on a searched topic, while reduction refers to subtracting part(s) of the example and pinpoint on a certain aspect of the searched topic. Substitution refers to replacing the initial example during the search process with relevant documents identified in the interim search result or with a new example composed by searchers. These query formulation tactics can be intertwined in information search activities under SBE.

Figure 1:
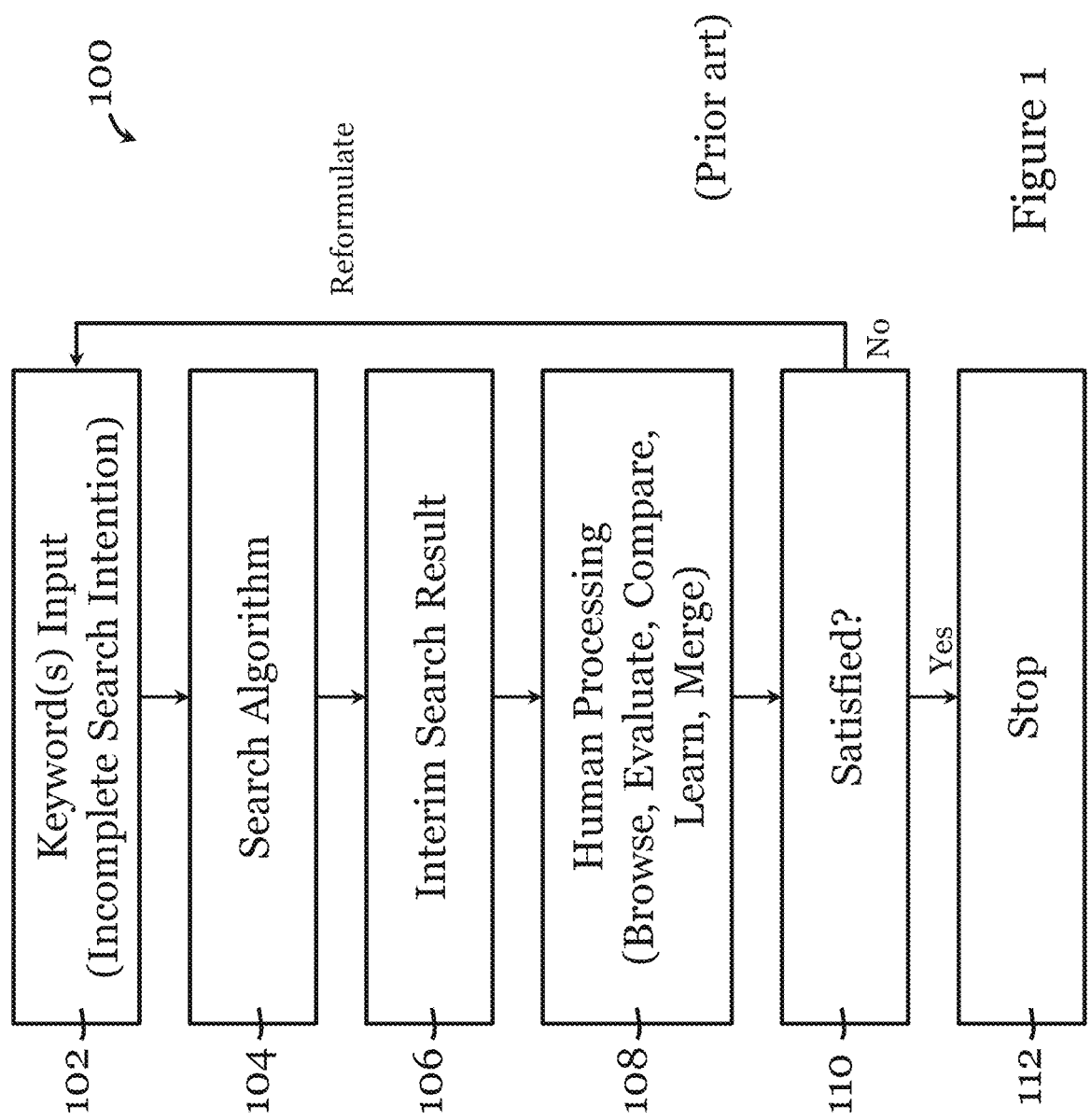
FIG. 1 is a flowchart showing a known process of searching of electronic documents using keyword-based query.

The search process of SBE (FIG. 2) in one embodiment is similar to that of SBK (FIG. 1) in the sense that searchers can iteratively refine or update the search queries to satisfy their information need. Under SBK, to complete a relatively complex search task, searchers may need to engage in many search iterations, which involve repeated seeking and trying alternative keywords and intensive manual processing to gather and organize relevant search results from different search iterations. By contrast, SBE in one embodiment can be much more advantageous in handling complex search tasks. The SBE paradigm provides searchers with a higher degree of control by allowing them to use an example as query. Searchers may invest extra time in constructing and refining the example as the search input so that the search engine returns a result list with a higher proportion of relevant documents by utilizing the detailed information embedded in the example. Consequently, the increase in the quality of the interim search result can lead to a significant reduction in overall search efforts (i.e., search iterations and search time), especially in a complex search task. On the one hand, under the SBE paradigm, searchers can quickly collect enough information and finish the search. Ideally, with a valid example, searchers are able to accomplish a complex search task within a single search or iteration. On the other hand, by going through a high-yield interim search result list, searchers are navigated towards a correct direction in finding all the relevant information.

SBE in this embodiment is expected to be applicable to most if not all search tasks, in particular search tasks in which: (a) the information need is complex and ambiguous, (b) the search process could be long and comprehensive, and (c) the search strategies to attain desired outcomes are highly uncertain. Such tasks include a set of domain-specific information retrieval tasks, such as patent search, legal research, academic literature search, medical information retrieval, etc. Under these use cases because searchers are generally more willing to spend extra time composing queries if they can obtain a relatively complete list of results within one or a few rounds of search iterations. Moreover, in domain-specific information retrieval searchers often possess some readily available materials at hand that can be used directly as an initial example (input of SBE).

Table 1 summarizes the comparison between SBK and SBE from four aspects, namely query input, query formulation tactics, search process, and application scopes.

TABLE 1

Comparisons between SBK and SBE

|  | Search by Keyword (SBK) | Search by Example (SBE) |
|---|---|---|
| Query Input | Query term(s) (Incomplete search intention) | Example(s) (Relatively complete search intention) |
| Query Formulation Tactics | Specification Expansion Reduction Substitution | |
| Search Process | Low query composing cost Incomplete interim search result | Relatively high query composing cost Relatively complete interim search result |
| | For complex information search: | |
| | Many iterations Heavy human processing | Much fewer iterations Less human processing |
| Preferred Application Scope | Well-defined information search title search company search email search product search and so on | Complex information search literature search patent search medical search legal search corporate document search and so on |

Implementation

In one embodiment, to implement the SBE paradigm, a simple algorithm based on the logistic regression with three key features is introduced. These three key features are "Text Similarity", "Topical Similarity", and 'CrowdRank" as further detailed elbow.

Text Similarity

Text information is in general unstructured. To represent textual information in a structured format, a document can be quantized or otherwise considered as a vector of numbers, each of which measures the presence of a specific term (e.g., term frequency) in the document. The size of the vector is the total number of terms in the vocabulary defined for the document collection M. To account for the popularity of different terms in general, the term frequency-inverse document frequency (tf-idf) measure, such as the one given in Equation (2), can be used in assessing the weight of each term t in the document vector $Q_{tf\text{-}idf}$.

$$tf\text{-}idf_t = tf_{t,d} \times \log\left(\frac{N}{df_t}\right) \quad (2)$$

where $tf_{t,d}$ is the term frequency of term t in document d, and $idf_t$ denotes the inverse document frequency, which is defined as the total number of documents in the collection (i.e., N) divided by the number of documents containing the term t (i.e., $df_t$). By incorporating the inverse document frequency, general terms (terms that appear frequently in a document) are given a relatively smaller weight, because they have less discriminating power in determining relevance.

The similarity between the query input and a document in the collection at the term level can be measured by the cosine similarity between the two vectors (of the input and the document respectively), which is defined as follows $$TextSimilarity_{qd} = \frac{Q_{tf\text{-}idf} \cdot D_{tf\text{-}idf}}{|Q_{tf\text{-}idf}||D_{tf\text{-}idf}|} \quad (3)$$

where the numerator denotes the dot product of the two vectors $Q_{tf\text{-}idf}$ and $D_{tf\text{-}idf}$, and the denominator is the product of their Euclidean lengths. The dot product is defined as $\Sigma_{i=1}^{M} q_i d_i$, where $q_i$ is the ith component, $tf_{i,q} \times idf_i$, of the query vector, and $d_i$ is the ith component, $tf_{i,d} \times idf_i$, of the document vector. The Euclidean length of the query and document vectors is calculated as $\sqrt{\Sigma_{i=1}^{M} q_i^2}$ and $\sqrt{\Sigma_{i=1}^{M} d_i^2}$, respectively.

Topical Similarity

In one implementation of SBE, the Latent Dirichlet Allocation (LDA) model is applied to uncover and characterize the latent topics in textual information. In the LDA model, each document can be characterized as a probabilistic distribution over a number of latent topics, and each topic is a distribution over all terms defined in a dictionary. To assess the relevance of a document against the example (the input), a K-component topic vector is first constructed based on the LDA model for the example and each document in the collection (e.g., in the repository), where K is the number of topics. Then, the TopicalSimilarity feature for a document can be defined as the cosine similarity between its topic vector and the example's topic vector:

$$TopicalSimilarity_{qd} = \frac{Q_{lda} \cdot D_{lda}}{|Q_{lda}||D_{lda}|} \quad (4)$$

where $Q_{lda}$ and $D_{lda}$ are the topic vectors of the example-based query q and a document d in the collection over K topics computed from the LDA model, respectively.

CrowdRank

To exploit the link structure among documents and at the same time take the topic coverage of documents into consideration, a feature called CrowdRank is constructed by leveraging the wisdom of crowds implicitly embedded in the link relationships among documents. The idea is that if many other documents (i.e., the "crowd") that are topically similar to the query link to a specific document, then this specific document is likely to be relevant to the query.

To implement the CrowdRank measure, the link choices of all other documents are aggregated in terms of whether each document links to a document d or not, and to distinguish relevant link choices from irrelevant link choices, each link choice is weighted by the topical similarity between the linking document and the query q. Equation (5) below provides the definition of this measure.

$$CrowdRank_{qd} = \frac{\sum_{i}^{N-1} TopicalSimilarity_{qi} \cdot c_{id}}{1 + \ln(1 + LinkCount_d)} \quad (5)$$

where i is a document in the collection except for the focal document d. $c_{id}$ is a binary variable that denotes the link from document i to document d. $TopicalSimilarity_{qi}$ is the topical similarity between query q and document i. N is the total number of documents in the collection. $LinkCount_d$ is the number of incoming links to document d, which is put in the denominator to adjust for the popularity of a document. The logarithm of $LinkCount_d$ is used in the denominator to confine the scale of adjustment.

Figure 5:
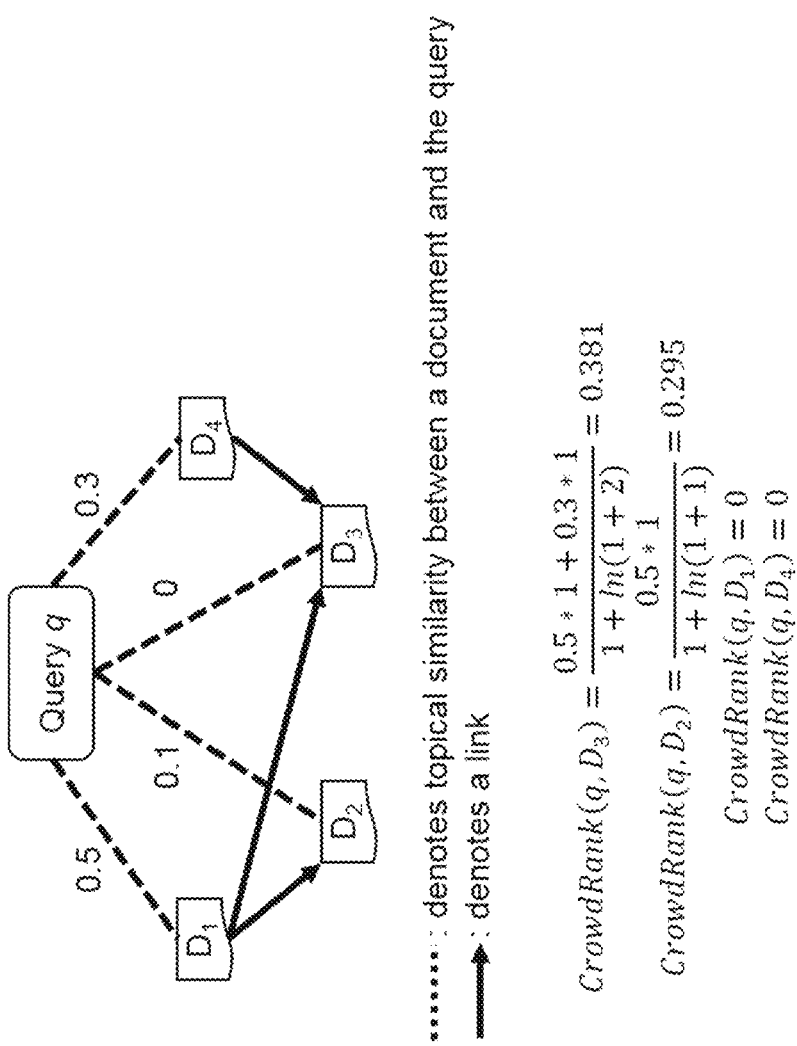
FIG. 5 is a schematic diagram illustrating determination of the topical based linkage score in the method of FIG. 4 in one embodiment of the invention.

FIG. 5 illusrtates a simple numerical example to further illustrate how the CrowdRank feature is calculated. CrowdRank not only evaluates the relevance of a document for a query input by looking at how many other documents link to it, but also considers the topic distribution of other documents that link to a focal document.

Theoretical Foundation and Hypothesis Development

The SBK paradigm can be used as benchmark in evaluating the effectiveness and applicability of the SBE paradigm.

The information foraging theory (IFT) is leveraged to conceptually compare the two paradigms, the existing SBK paradigm and the SBE paradigm of the present embodiment. IFT explains how users engage in information search through adaptive interaction with information. IFT can be adopted as the theoretical foundation to understand users' interaction with various information retrieval systems, to guide system design towards improved user experience, and to determine information provision in a website. The theory posits that search system design would determine the cost of different information foraging behaviours. These behaviours include following the information scent to navigate through information patches based on personal information diet so as to obtain necessary information. Information scent refers to the perception of potential relevance and utility of specific information obtained from proximal cues, while an information patch refers to a physical or virtual space for information, which in web search can be a temporary collection constructed by a search engine in response to a user query. Information diet refers to a set of information that has a certain perceived value to an information forager. The web search activities can be characterized as constructing and refining queries for a search engine to deliver information patches with a higher proportion of potentially relevant information (i.e., enrichment activity) and following information scent to select information items within and between patches based on personal information diet (i.e., scent-following activity).

In the SBK paradigm, the enrichment activity mainly involves selecting and refining keywords for the search engines. The keyword-seeking and scent-based assessment relies heavily on human cognitive efforts and are highly iterative in nature, especially for complex information search tasks. On the other hand, SBE takes a long query, referred to here as an "example", as input. An example could be a patent abstract, a research abstract, a full document, etc.. Compared to SBK, SBE provides users with a higher degree of control of the search process. In the enrichment activity, users can construct an example to include holistic information about complex search intentions and to reflect the various aspects of their information diet. By utilizing the example as input, SBE aims to deliver a comprehensive list of relevant information items. In other words, users are expected to obtain necessary information within one or a few patches using SBE for complex search tasks such as literature search and patent search. Thus, it can be hypothesized that on average users is able to gather higher-quality search results in each iteration under SBE than SBK in a complex search task (H1a).

SBE also makes it possible to shift more human effort to machine work in information search. First, the example-based query relieves users from seeking the most appropriate keywords by trial and error. Users only need to describe their search intention by defining an example, and then search algorithms under SBE are expected to effectively utilize all the information embedded in the example and deliver high-quality results. Second, SBE seeks to evaluate the strength of information scent for each document and then to select relevant documents automatically. Therefore, it can be hypothesized that on average users can obtain higher amount of relevant information per unit of search time under SBE than under SBK in a complex search task (H1b).

HYPOTHESIS 1: Compared with search by keyword (SBK), search by example (SBE) will lead to an improvement in search productivity for search users conducting complex search tasks, which can be characterized as (a) an increase in search quality per search iteration, and (b) an increase in search quality per unit of search time.

Experimental Evaluation

To empirically test the above hypotheses and to compare SBK with SBE, a randomized between-subject laboratory experiment was conducted. In the experiment, a search task was first defined. Then the performances of SBK and SBE for the same task were evaluated for comparison. In this test an academic literature search was selected as an empirical test. For this purpose, the two paradigms were implemented by developing a literature search tool for each paradigm.

The developed SBE tool is based on the SBE algorithm described in the Implementation subsection, as seen from the pseudocode in FIG. 6. The developed SBK tool is implemented by calling the Scopus Search API (https://dev.elsevier.com/documentation/ScopusSearchAPI.wadl). To ensure a fair comparison, these two tools differed only in the underlying algorithm, and all other features/factors remain exactly the same. The original Scopus search website for SBK was not used in order to avoid introducing any potential confounding factors.

Figure 7:
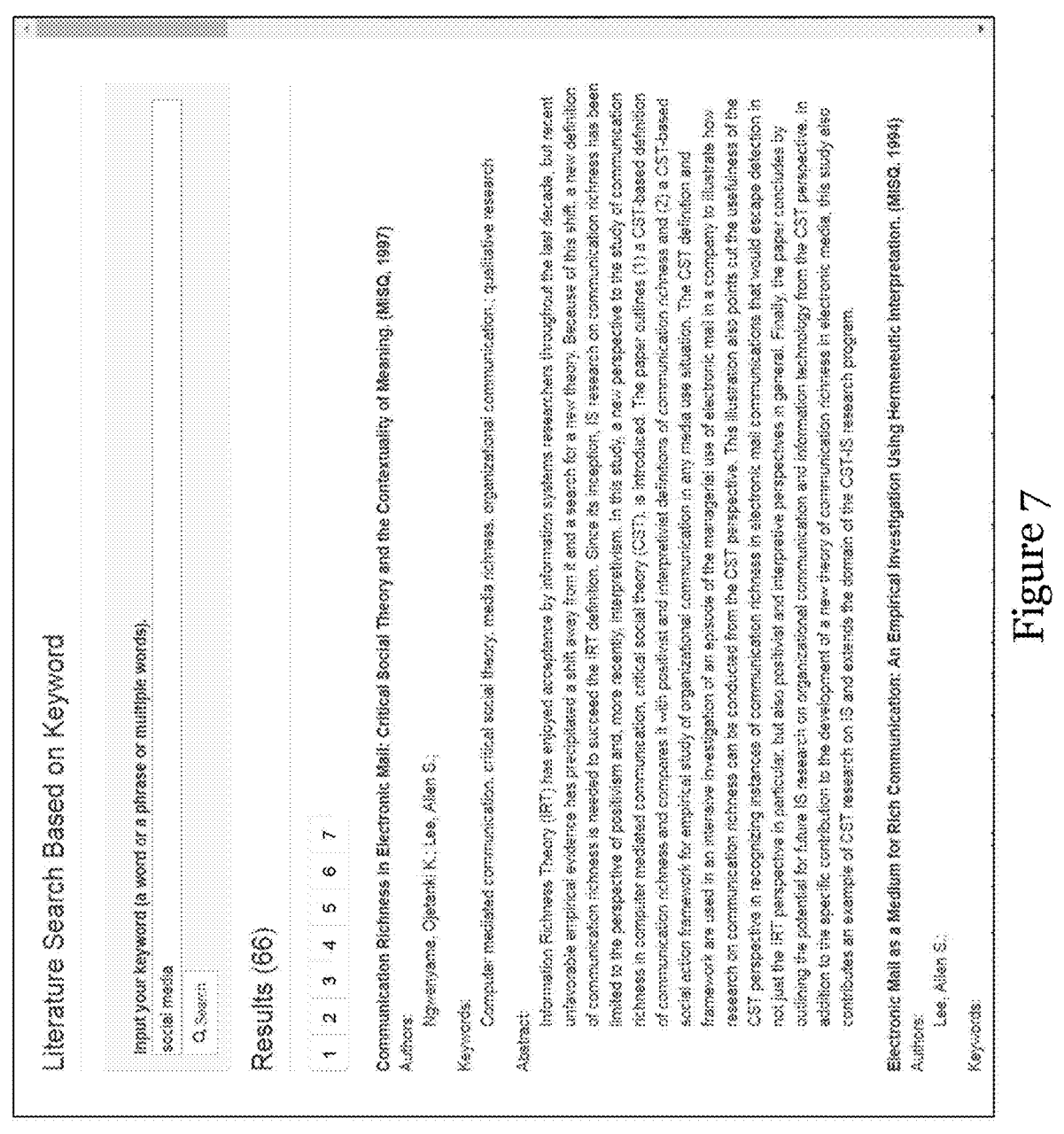
Figure 8:
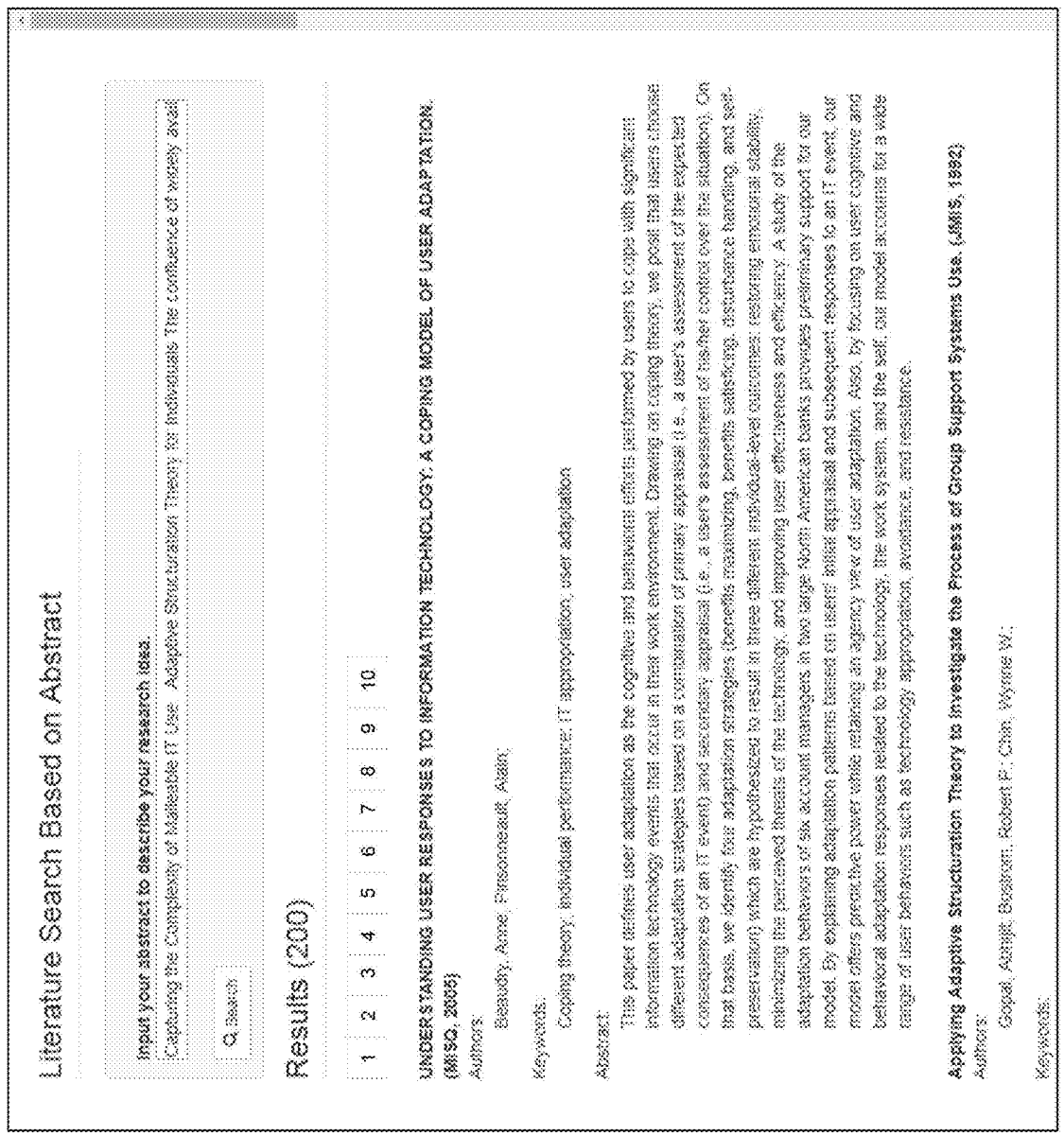
FIG. 8 is a screenshot of a tool that enables searching of electronic documents using example-based query in one embodiment of the invention.

FIGS. 7 and 8 are screenshots of the SBK and SBE tool built and presented to the user, respectively.

Data

To construct a document collection or repository for both tools (e.g., for testing both tools), 3,893 abstracts of IS research studies published in the three premier journals, *Information Systems Research* (*ISR*), *Journal of Management Information Systems* (*JMIS*) and MIS Quarterly (*MISQ*), in the time period of 1977 to 2016, were considered. The dataset is summarized in Table 2.

TABLE 2

Document Collection for the SBK and SBE tools

| Journal | # Articles | Period | # References within three journals |
|---|---|---|---|
| Information Systems Research | 862 | 1990-2016 | 5,520 |
| Journal of MIS | 1,284 | 1984-2016 | 9,110 |
| MIS Quarterly | 1,747 | 1977-2016 | 9,835 |
| Total | 3,893 | 1977-2016 | 24,465 |

These abstracts were downloaded from the Scopus website. In the SBK tool, the search scope was limited to these three journals only when calling the Scopus Search API. This ensured that the two tools shared the same document collection. For the SBE tool, a complete citation relationship map among all documents in the collection was needed to construct the CrowdRank feature. To obtain this, the reference lists of all articles were collected from multiple sources, including the official websites of the journals, JSTOR digital library, and Taylor & Francis Online database. In total, 24,465 references were identified in the dataset.

Search Task

The search task was designed to simulate the literature search process of finding relevant prior literature for a research project. Without loss of generality, one paper was randomly selected, from the 122 papers published in 2016 within the three top IS journals, as "the project".

FIG. 9 presents the title and abstract of this selected paper. The goal of the search task was to identify 30 relevant papers published in the three journals before 2016 to be used as references for the project. The reference choices made by the authors of the selected paper are considered as the gold standard; in this specific case, there are 31 references within the three journals. Although not all relevant prior studies may have been cited by the authors, those papers cited by the authors should be sufficiently relevant.

Experimental Process 20 participants (doctoral students) in the relevant field were recruited for the experiment. The participants were randomly assigned between two groups to perform the same search task, one group using SBK tool and the other using SBE tool (i.e., ten subjects per group).

The experimental procedures 1000 for both groups were illustrated in FIG. 10. Before beginning the search, participants were asked to fill out a pre-task questionnaire in terms of their backgrounds and experience with academic search engines. Then, a tutorial was given to the participants to explain the search task and rewards for the top performers in terms of accuracy and efficiency. Next, the title and abstract of the chosen paper (FIG. 9) was shown to the participants, who were then given sufficient time to read and understand the research project. A training video on how to use the assigned SBK/SBE tool for each group was played to help the participants to get familiar with the interface and functionality of the tool. The participants were required to record the titles of the 30 articles selected by them as the references for the research project and the corresponding queries they used. They were also instructed specifically not to use any other tools (e.g., Google Scholar) to complete the task. The time each participant spent in searching only (as shown in FIG. 10) was recorded. There was no time limit for completing the task, but the participants were motivated to finish as soon as possible to increase their chance of getting the reward. After finishing the search task, participants were asked to fill out a post-task questionnaire to evaluate their experience with the search tool.

To ensure that the search tool was manipulated successfully, in the post-task questionnaire for the SBE group, one question relates to whether or not participants find the tool they used as a new search system that was different from traditional literature search engines such as Scopus and Google Scholar. The purpose was to check if the participants had a correct understanding of the usage and functionality of the SBE tool. Among the ten subjects in the SBE group, only one subject did not agree that the SBE tool is a new search system. The search behaviours of this subject were further investigated and it was found that this subject tended to use short queries rather than long queries for the SBE tool, which implies that this subject had not followed the instructions in the training video closely. As a result this sample was discarded or dropped for the analysis, giving a total of nine observations for the SBE group.

To check whether or not the two groups are observationally similar to each other, several tests were conducted based on the pre-task questionnaire. Using t-tests, the two experimental groups were compared based on age, years of work experience, years in the Ph.D. program, with or without master's degree, experience with literature search engines, search skills, and familiarity with the searched topic. None of these tests was significant at the 10% level, suggesting that there was no significant difference between the two groups. As to the subjects' experience with the assigned literature search tool, it had been found through the post-task questionnaire that participants in the SBK group indicate that they had used similar search systems for more than five years, whereas participants in the SBE group had never used any similar systems ($\chi^2$=16.33, df=4, p-value=0.003), implying a significant advantage for the SBK tool.

Experimental Results and Discussions

Table 3 below presents the summary statistics of five performance measures for the two experimental groups. In addition to testing the hypotheses on search productivity, the measures related with search accuracy and search effort were also investigated. T-tests were conducted to evaluate whether or not the differences between the two groups were significant.

TABLE 3

Summary Statistics of Performance Measures for Both Groups

| | Paradigm | N | Mean | Std. Dev. | Min | Median | Max |
|---|---|---|---|---|---|---|---|
| # Relevant Articles | SBK | 10 | 8.4 | 1.07 | 7 | 8 | 10 |
| | SBE | 9 | 9.1 | 1.27 | 7 | 10 | 10 |
| # Unique Queries (Iterations) | SBK | 10 | 10.7 | 2.58 | 7 | 11.5 | 14 |
| | SBE | 9 | 7.1 | 2.57 | 3 | 7 | 11 |
| Time (Minutes) | SBK | 10 | 59.3 | 12.31 | 42 | 58 | 75 |
| | SBE | 9 | 53.2 | 14.06 | 29 | 53 | 73 |
| Search Productivity 1 | SBK | 10 | 0.83 | 0.23 | 0.5 | 0.87 | 1.14 |
| | SBE | 9 | 1.50 | 0.78 | 0.64 | 1.4 | 3.33 |
| Search Productivity 2 | SBK | 10 | 0.15 | 0.04 | 0.11 | 0.14 | 0.23 |
| | SBE | 9 | 0.18 | 0.05 | 010 | 0.19 | 0.24 |

Notes:
(1) Search Productivity 1 is the average number of relevant articles per search iteration (or unique query), and Search Productivity 2 is the average number of relevant articles per unit of search time.
(2) The gold standard is the reference choices made by the authors of the selected paper shown in FIG. 9.
(3) The host for both tools is a Dell PowerEdge R620 server with two 8-core Xeon 2.4 GHz processors, 192 GB RAM, and 6 TB hard disk.

Table 4 summarizes the test results and performance comparisons.

TABLE 4

Performance Comparisons between SBK and SBE

| | Difference in Mean (SBE-SBK) | T-Statistic | Conclusion |
|---|---|---|---|
| # of Relevant Articles | +0.7 | 1.32 | Not Significant |
| # Unique Queries (Iterations) | −3.6*** | −3.03 | Significant Reduction in Iterations |
| Time (Minutes) | −6.1 | −1.00 | Not Significant |
| Search Productivity 1 | +0.67** | 2.47 | Hypothesis 1a supported |
| Search Productivity 2 | +0.03* | 1.77 | Hypothesis 1b supported |

Note:
(1) The two-sample t-test is used to determine whether or not the differences in mean between two groups are significant.
(2) Unequal-variance t-test is used for Search Productivity 1, while equal-variance t-tests are used for the other performance measures.
(3) Significance levels: *p < .1, p < .05, *p < .01.

Comparison in Search Accuracy

As shown in Table 3, among the 30 articles compiled by the subjects using the SBK tool, on average they were able to retrieve 8.4 relevant results as per the gold standard (i.e., the reference choices made by the authors of the selected paper). By contrast, with the SBE tool, the average subject is able to retrieve 9.1 relevant results. Although the difference in mean between the SBE and SBK groups was positive, it was not statistically significant according to the t-test reported in Table 4.

By examining the percentile, it has been found that 75% of the subjects are able to find more than 9 relevant articles using the SBE tool, whereas only 25% of the subjects using the SBK tool could do the same. This suggests an improvement in search accuracy under the SBE paradigm over the SBK paradigm for this task.

Comparison in Search Effort

For the experiment, the subjects were asked to record the corresponding queries io used to find the 30 articles. The number of unique queries used by each subject were used to represent the number of search iterations taken to complete the search task. Table 3 shows that it takes on average 10.7 iterations for subjects using the SBK tool but only 7.1 iterations for subjects using the SBE tool. The t-test statistics shown in Table 4 suggests that the difference between the two groups is statistically significant at the 1% level. Moreover, a relatively significant difference in the minimum number of search iterations between the two groups was observed. One subject in the SBE group was able to complete the task within three search iterations, whereas the minimum number of search iterations in the SBK group was seven. These results suggested a significant reduction in search iterations for search users under the SBE paradigm compared with the SBK paradigm.

Figure 11:
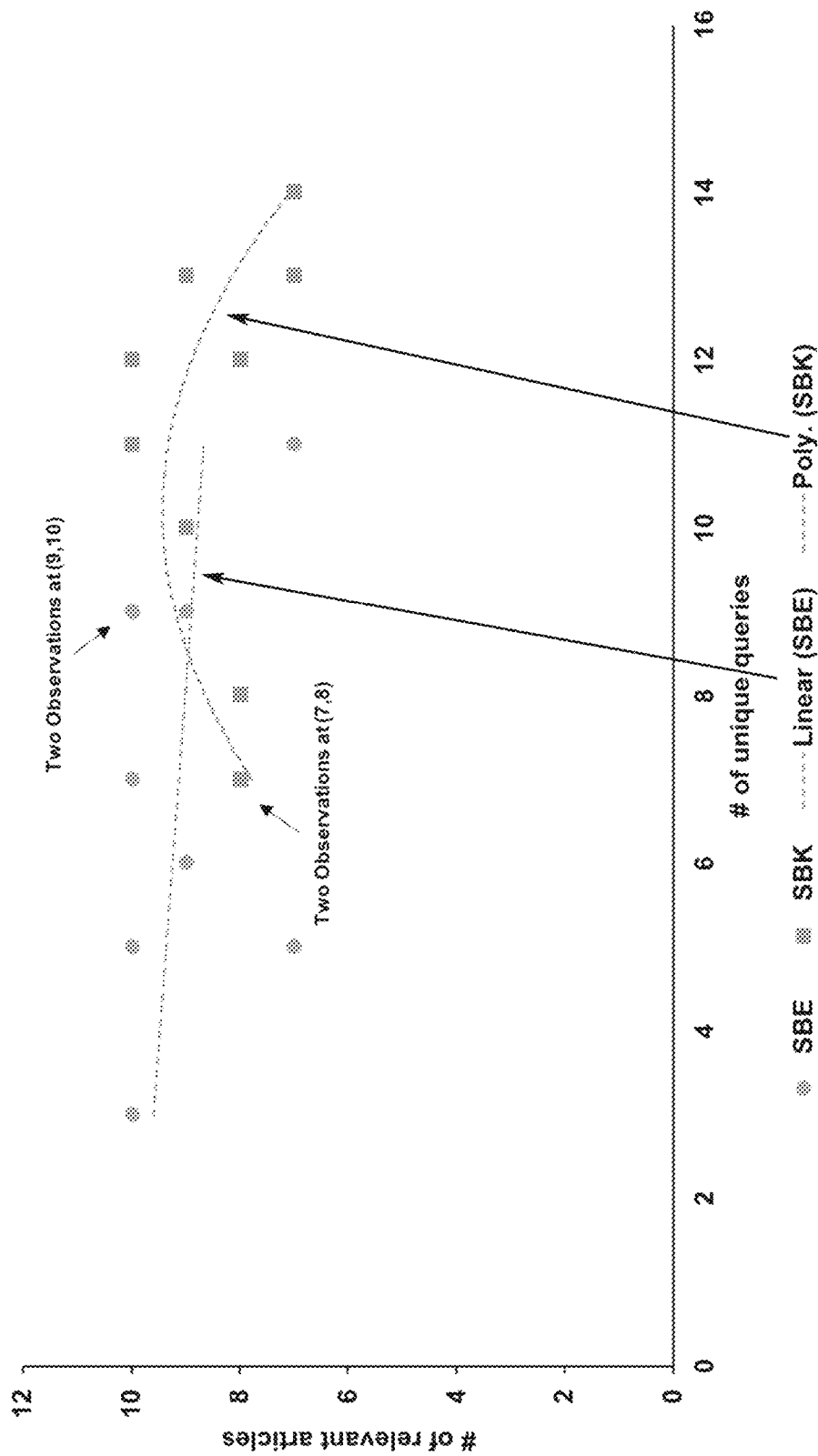
FIG. 11 is a plot of the experiment results, showing search accuracy and search iteration for all participants who has performed the search experiment using the tools illustrated in FIGS. 7 and 8.

To understand the relationship between search effort and search accuracy, the number of search iterations and the number of relevant articles retrieved by each subject for both paradigms are plotted in the graph of FIG. 11. Interestingly, it has been found that a non-linear, more specifically, inverted U-shape, relationship exists between search accuracy and search iterations under the SBK paradigm. However, under the SBE paradigm search accuracy slightly decreases as the number of search iterations increases. This result, while only based on a small number of subjects in the context of literature search, may suggest at the possibility that users are able to achieve a remarkable performance upon just a few iterations with a valid example under SBE, which is in general not possible under the traditional paradigm of SBK for complex search tasks.

Regarding search efficiency, the time consumed by subjects in completing the search task for both groups was recorded. It on average took the subjects 59.3 minutes to finish the task using the SBK tool, while the average time using the SBE tool was 53.2 minutes. However, the difference in search time between the two groups was not statistically significant according to the t-test.

Comparison in Search Productivity

To test the proposed hypotheses, the experiment focused on the search productivity of search users. Productivity is related to both the amount of output and the cost of resources/efforts. In this context, search productivity is defined as the gain of relevant information per unit cost of human effort. To operationalize it, two measurements are defined: (1) the average number of relevant articles retrieved by a user per search iteration (Equation 6), and (2) the average number of relevant articles per unit of search time (Equation 7).

$$\text{Search Productivity 1} = \frac{\# \text{ of relevant articles}}{\# \text{ of search iterations}} \qquad (6)$$

$$\text{Search Productivity 2} = \frac{\# \text{ of relevant articles}}{\text{search time}} \qquad (7)$$

As shown in Table 3, the mean of Search Productivity 1 was 0.83 for the SBK tool and the mean of Search Productivity 1 was 1.50 for the SBE tool; the mean of Search Productivity 2 is 0.15 for the SBK tool and the mean of Search Productivity 2 was 0.18 for the SBE tool.

The t-tests in Table 4 suggest that on average search users using the SBE tool significantly outperform those using the SBK tool in terms of these two search productivity measures. That is, search users are able to obtain a higher amount of valuable information per unit cost of search effort by adopting the SBE tool. The Wilcoxon rank-sum test was performed as a robustness check. The test statistics showed that the two groups are significantly different at the 5% level for Search Productivity 1 and at the 10% level for Search Productivity 2, which is consistent with the results from t-tests. Therefore, it can be concluded that both H1a and H1b are supported.

Implications for Information Search

The above results suggest that the SBE paradigm has the potential to significantly improve users' search productivity in more complicated search task such as but not limited to literature search.

Scalability

The response time of real-time search based on example input can be a technical challenge as the size of the document repository increases.

Compared to keyword-based search, SBE would require more computing cost in processing the example and assessing the relevance between the example and existing documents in the repository. As an illustration, assess the complexity of the proposed search algorithm shown in FIG. 4. The search algorithm consists of query processing, feature construction, and document retrieval. The query processing involves calculating the TF-IDF vector of the given example and inferring its topical distribution based on the estimated LDA model. The running time for TF-IDF transformation grows linearly with the number of unique words ($M_e$) in the example (i.e., $O(M_e)$), while the complexity of LDA inference for one example is linear with $M_e$, K, and I, where K is the number of topics and I is the number of iterations specified by developers. In one example, set K to be 300 and I to be 100. Thus, the time complexity of LDA inference is also $O(M_e)$ as K and I are both constant.

The feature construction is the time-consuming part of the search algorithm, involving the computation of text similarity between the example and each document in the repository, topical similarity, and CrowdRank. Assuming the complexity to compute the cosine measure is O(S), where S is the dimensionality of the two vectors, the running time of computing text similarity is linear with the average number of words that are common between two documents ($M_a$) and the number of documents in the repository (N) (i.e., $O(N*M_a)$). Similarly, the complexity of computing topical similarity is $O(N*K)$. To calculate the CrowdRank feature, the complexity is $O(N^2)$, since the computation involves a traversal through the citation network. The document retrieval mainly involves sorting all documents by relevance scores, in which time complexity is $O(N*\log(N))$.

As a result, the complexity of the search algorithm is $O(N^2)$, where the computation of CrowdRank is the most time-consuming part. For the SBE tool in the experiment, the response time is about 20 seconds on the test server for each search request, where the total number of documents is nearly 4,000. In this example the running environment of the server is Dell PowerEdge R620 server with two 8-core Xeon 2.4 GHz processors, 192 GB RAM, and 6TB hard disk. Therefore, it can be said that when the corpus size is medium, the current design of the search algorithm would be sufficiently efficient. However, to handle a large dataset, it is necessary to improve the search algorithm under SBE to make it more scalable. One example includes the use of a MapReduce parallel framework to significantly reduce the computing time.

Hardware and Related System

Figure 12:
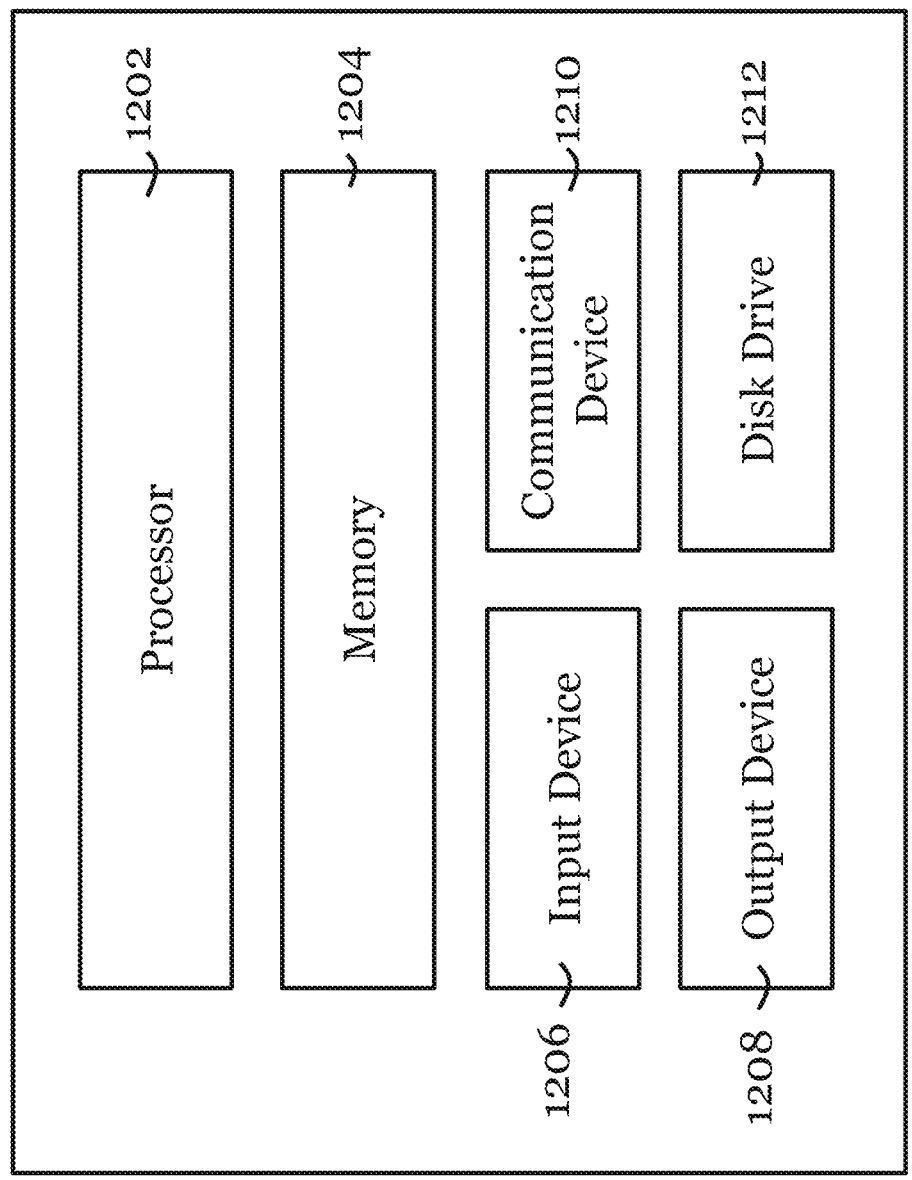
FIG. 12 is a functional block diagram of an information handling system operable to implement the method of Figure 4 in one embodiment of the invention.

FIG. 12 shows an exemplary information handling system 1200 that can be used as a server or other information processing systems in one embodiment of the invention. For example, the information handling system 1200 may be used as or as part of the user devices 302A, 302B, or the electronic document repository 306 of FIG. 3. The information handling system 1200 may be used to implement the SBE-based search method of any of the above embodiments.

The information handling system 1200 may have different configurations, and it generally comprises suitable components necessary to receive, store, and execute appropriate computer instructions, commands, or codes. The main components of the information handling system 1200 are a processor 1202 and a memory 1204. The processor 1202 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process data. The memory 1204 may include one or more volatile memory (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 1200 further includes one or more input devices 1206 such as a keyboard, a mouse, a stylus, an image scanner, a microphone, a tactile input device (e.g., touch sensitive screen), and an image/video input device (e.g., camera). The information handling system 1200 may further include one or more output devices 1208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 1200 may further include one or more disk drives 1212 which may encompass solid state drives, hard disk drives, optical drives, flash drives, and/or magnetic tape drives. A suitable operating system may be installed in the information handling system 1200, e.g., on the disk drive 1212 or in the memory 1204. The memory 1204 and the disk drive 1212 may be operated by the processor 1202. The information handling system 1200 also preferably includes a communication device 1210 for establishing one or more communication links (not shown) with one or more other computing devices such as servers, personal computers, terminals, tablets, phones, or other wireless or handheld computing devices. The communication device 1210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. io Preferably, the processor 1202, the memory 1204, and optionally the input devices 1206, the output devices 1208, the communication device 1210 and the disk drives 1212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 1200 shown in FIG. 2 is merely exemplary and different information handling systems 1200 with different configurations may be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

The above embodiments of the invention have provided computer implemented methods and related systems for searching electronic documents, which are inextricably linked to computer technologies. The methods, generally referred to as search by example (SBE), can address the difficulty in locating the most suitable keyword(s) for search tasks, especially complex information search tasks. The SBE paradigm relaxes the keyword input assumption and allows users to construct a long query (i.e., example) to describe the information need in detail. In particular the example-based query relieves users from the burden of formulating and selecting the most appropriate keyword(s) through cognitive processing and trial-and-error. As a result the SBE paradigm could potentially be more effective in identifying high-quality results by utilizing more information in an example. Also SBE may increase the information gain per unit cost of search effort for knowledge workers in information search tasks. SBE brings additional machine intelligence into the information search process. The SBE paradigm can be a powerful alternative or complement to the existing SBK paradigm. In some implementations the proposed SBE paradigm can be completely independent from the existing SBK paradigm and allows users to submit an example as input (as search query). The example input may be an electronic document, such as one existing in the repository of electronic documents, or it may be any string of text composed by users to describe their detailed search intention in detail. Future search engines can be developed under the SBE paradigm to enable more efficient and effective search for complex information search tasks. SBE of the above embodiments include feature called "CrowdRank" integrated with some known features under the SBE paradigm. An initial implementation of the SBE paradigm based on these features has yielded promising results. Individuals, organizations, or the like, can potentially improve the productivity of their search by using the SBE paradigm or by adopting the SBE paradigm for electronic document search systems or more generally information search systems.

The expression "electronic documents", "documents", or the like in the above description can be in any format, size, or file type. "Electronic documents", "documents", or the like can be a plain text file, an html file, a pdf file, a word file, or any other materials containing or otherwise including meaningful text information.

It will be appreciated by persons skilled in the art that numerous variations and/or modifications may be made to the invention as shown in the specific embodiments without departing from the scope of the invention as broadly described or claimed. One or more features in each embodiment may be applied or otherwise incorporated to another embodiment. Different features from different embodiments can be modified and combined as necessary, as long as these modifications are technically compatible and possible. The described embodiments of the invention should therefore be considered in all respects as illustrative, not restrictive.

In some implementations, the system and method of the invention can be used for searching other forms of internet resources, not limited to electronic documents. Of course, depending on the type of input that represents the example-based search query, the processing of the input may be different. The processing may include but not limited to text extraction, text recognition, text identification, text correction/auto-correction, etc. The determination of the textual similarity score, the topical similarity score, the topical based linkage score, and the relevance score may or may not use the specific equations illustrated, provided that a correspondingly reliable measure can be obtained.

The invention claimed is:

1. A computer implemented method for searching electronic documents, comprising:
 receiving, from a user, an input representing an example-based search query, the input including one or more sentences or paragraphs of text;
 processing the input, including
  identifying one or more terms from the input based on comparing the input with a text database to identify one or more terms in the input contained in the text database;
  determining a weighting factor for each of the one or more identified terms, wherein the weighting factor is a term frequency-inverse document frequency factor determined based on the input and a plurality of electronic documents;
  determining a textual vector of the input based on the one or more determined weighting factors; and
  determining, using a topic modelling method based on a Latent Dirichlet Allocation model, a topical distribution associated with the input, including quantizing the topical distribution associated with the input as a topical vector;
 determining, for each of the plurality of electronic documents, a textual similarity score between the input and a corresponding electronic document based on the determined textual vector of the input and a textual vector of the corresponding electronic document;
 determining, for each of the plurality of electronic documents, a topical similarity score between the input and the corresponding electronic document based on the topical vector of the input and a topical vector of the corresponding electronic document;
 determining, for each of the plurality of electronic documents, a topical based linkage score between the input and the corresponding electronic document based on the determined topical similarity scores and linkage relationship in a linkage network of the plurality of electronic documents;
 determining, for each of the plurality of electronic documents, a relevance score between the input and the corresponding electronic document based on
  (i) the determined textual similarity score between the input and the corresponding electronic document,
  (ii) the determined topical similarity score between the input and the corresponding electronic document, and
  (iii) the determined topical based linkage score between the input and the corresponding electronic document;
 determining, based on each of the determined relevance scores of the plurality of electronic documents, a search result to be provided to the user, the search result containing one or more of the plurality of electronic documents; and
 providing the search result to the user, including displaying the search result to the user.

2. The computer implemented method of claim 1, wherein receiving the input comprises:
 receiving an electronic document file, and
 processing the electronic document file to extract text content from the received electronic document file so as to use the extracted text content as the input.

3. The computer implemented method of claim 1, wherein the relevance score between the input and the corresponding electronic document is determined based on $$\alpha \times \ln(\text{TextSimilarity}_{qd}) + \beta \times \ln(\text{TopicalSimilarity}_{qd}) + \gamma \times \ln(\text{CrowdRank}_{qd})$$

where $\alpha$, $\beta$, $\gamma$ are coefficients, $\text{TextSimilarity}_{qd}$ represents the corresponding determined textual similarity score, $\text{TopicalSimilarity}_{qd}$ represents the corresponding determined topical similarity score, andCrowdRank$_{qd}$ represents the corresponding determined topical based linkage score.

4. The computer implemented method of claim 3, wherein α, β, γ are predetermined constants.

5. The computer implemented method of claim 1, wherein in the linkage network of the plurality of electronic documents:
at least one of the electronic documents is a linked document being linked to by one or more of the other electronic documents, and
at least one of the electronic documents is a linking document including a link to one or more of the other electronic documents.

6. The computer implemented method of claim 1, wherein determining the search result comprises:
sorting the plurality of electronic documents based on the determined relevance scores.

7. The computer implemented method of claim 6, wherein the sorting is arranged in a descending order of the determined relevance scores.

8. The computer implemented method of claim 1, wherein determining the search result comprises:
comparing the plurality of determined relevance scores with a threshold relevance score; and
identifying, based on the comparison, one or more electronic documents having respective determined relevance score higher than the threshold relevance score for inclusion in the search result.

9. The computer implemented method of claim 1, wherein determining the search result comprises:
identifying, from the plurality of electronic documents, a predetermined number of the electronic documents with the highest determined relevance scores for inclusion in the search result.

10. A system for searching electronic documents, comprising:
one or more processors arranged to:
receive an input representing an example-based search query, the input including one or more sentences or paragraphs of text;
process the input, including
identifying one or more terms from the input based on comparing the input with a text database to identify one or more terms in the input contained in the text database;
determining a weighting factor for each of the one or more identified terms, wherein the weighting factor is a term frequency-inverse document frequency factor determined based on the input and a plurality of electronic documents;
determining a textual vector of the input based on the one or more determined weighting factors; and
determining, using a topic modeling method based on a Latent Dirichlet Allocation model, a topical distribution associated with the input, including quantizing the topical distribution associated with the input as a topical vector;
determine, for each of the plurality of electronic documents, a textual similarity score between the input and a corresponding electronic document based on the determined textual vector of the input and a textual vector of the corresponding electronic document;
determine, for each of the plurality of electronic documents, a topical similarity score between the input and the corresponding electronic document based on the topical vector of the input and a topical vector of the corresponding electronic document;
determine, for each of the plurality of electronic documents, a topical based linkage score between the input and the corresponding electronic document based on the determined topical similarity scores and linkage relationship in a linkage network of the plurality of electronic documents;
determine, for each of a plurality of electronic documents, a relevance score between the input and the corresponding electronic document based on
(i) the determined textual similarity score between the input and the corresponding electronic document,
(ii) the determined topical similarity score between the input and the corresponding electronic document, and
(iii) the determined topical based linkage score between the input and the corresponding electronic document;
determine, based on all each of the determined relevance scores of the plurality of electronic documents, a search result to be provided to the user, the search result containing one or more of the plurality of electronic documents; and
display the search result to the user.

11. A non-transitory computer readable medium storing computer instructions that when executed by one or more processors, the causes the one or more processors to perform a method for searching electronic documents, the method comprising:
receiving, from a user, an input representing an example-based search query, the input including one or more sentences or paragraphs of text;
processing the input, including
identifying one or more terms from the input based on comparing the input with a text database to identify one or more terms in the input contained in the text database;
determining a weighting factor for each of the one or more identified terms, wherein the weighting factor is a term frequency-inverse document frequency factor determined based on the input and a plurality of electronic documents;
determining a textual vector of the input based on the one or more determined weighting factors; and
determining, using a topic modelling method based on a Latent Dirichlet Allocation model, a topical distribution associated with the input, including quantizing the topical distribution associated with the input as a topical vector;
determining, for each of the plurality of electronic documents, a textual similarity score between the input and a corresponding electronic document based on the determined textual vector of the input and a textual vector of the corresponding electronic document;
determining, for each of the plurality of electronic documents, a topical similarity score between the input and the corresponding electronic document based on the topical vector of the input and a topical vector of the corresponding electronic document;
determining, for each of the plurality of electronic documents, a topical based linkage score between the input and the corresponding electronic document based on the determined topical similarity scores and linkage relationship in a linkage network of the plurality of electronic documents;

determining, for each of a plurality of electronic documents, a relevance score between the input and the corresponding electronic document based on
(i) the determined textual similarity score between the input and the corresponding electronic document,
(ii) the determined topical similarity score between the input and the corresponding electronic document, and
(iii) the determined topical based linkage score between the input and the corresponding electronic document;
determining, based on each of the determined relevance scores of the plurality of electronic documents, a search result to be provided to the user, the search result containing one or more of the plurality of electronic documents; and
providing the search result to the user, including displaying the search result to the user.

12. The system of claim 10,
wherein the relevance score between the input and the corresponding electronic document is determined based on $$\alpha \times \ln(\text{TextSimilarity}_{qd}) + \beta \times \ln(\text{TopicalSimilarity}_{qd}) + \gamma \times \ln(\text{CrowdRank}_{qd})$$

where $\alpha, \beta, \gamma$ are coefficients, $\text{TextSimilarity}_{qd}$ represents the corresponding determined textual similarity score, $\text{TopicalSimilarity}_{qd}$ represents the corresponding determined topical similarity score, and $\text{CrowdRank}_{qd}$ represents the corresponding determined topical based linkage score.

13. The non-transitory computer readable medium of claim 11,
wherein the relevance score between the input and the corresponding electronic document is determined based on $$\alpha \times \ln(\text{TextSimilarity}_{qd}) + \beta \times \ln(\text{TopicalSimilarity}_{qd}) + \gamma \times \ln(\text{CrowdRank}_{qd})$$

where $\alpha, \beta, \gamma$ are coefficients, $\text{TextSimilarity}_{qd}$ represents the corresponding determined textual similarity score, $\text{TopicalSimilarity}_{qd}$ represents the corresponding determined topical similarity score, and $\text{CrowdRank}_{qd}$ represents the corresponding determined topical based linkage score.

14. The computer implemented method of claim 1, wherein the term frequency-inverse document frequency factor for each of the one or more identified terms is determined based on $$tf_{t,d} \times \log\left(\frac{N}{df_t}\right)$$

where $tf_{t,d}$ is frequency of term t in the input d, N is the total number of the electronic documents, $df_t$ is the number of the electronic documents containing the term t.

15. The system of claim 10, wherein the term frequency-inverse document frequency factor for each of the one or more identified terms is determined based on $$tf_{t,d} \times \log\left(\frac{N}{df_t}\right)$$

where $tf_{t,d}$ is frequency of term t in the input d, N is the total number of the electronic documents, $df_t$ is the number of the electronic documents containing the term t.

16. The non-transitory computer readable medium of claim 11, wherein the term frequency-inverse document frequency factor for each of the one or more identified terms is determined based on $$tf_{t,d} \times \log\left(\frac{N}{df_t}\right)$$

where $tf_{t,d}$ is frequency of term t in the input d, N is the total number of the electronic documents, $df_t$ is the number of the electronic documents containing the term t.

17. The computer implemented method of claim 1, wherein the topical based linkage score between the input and the corresponding electronic document is determined based on $$\frac{\sum_{i}^{N-1} \text{TopicalSimilarity}_{qi} \cdot c_{id}}{1 + \ln(1 + \text{LinkCount}_d)}$$

where i is an electronic document in the plurality of electronic documents except a focal electronic document d of which the topical based linkage score is to be calculated, $c_{id}$ is a binary variable that denotes a link from electronic document i to electronic document d, $\text{TopicalSimilarity}_{qi}$ is the topical similarity score between the input and the electronic document i, N is the total number of electronic document, $\text{LinkCount}_d$ is the number of incoming links to electronic document d.

18. The system of claim 10, wherein the topical based linkage score between the input and the corresponding electronic document is determined based on $$\frac{\sum_{i}^{N-1} \text{TopicalSimilarity}_{qi} \cdot c_{id}}{1 + \ln(1 + \text{LinkCount}_d)}$$

where i is an electronic document in the plurality of electronic documents except a focal electronic document d of which the topical based linkage score is to be calculated, $c_{id}$ is a binary variable that denotes a link from electronic document i to electronic document d, $\text{TopicalSimilarity}_{qi}$ is the topical similarity score between the input and the electronic document i, N is the total number of electronic document, $\text{LinkCount}_d$ is the number of incoming links to electronic document d.

19. The non-transitory computer readable medium of claim 11, wherein the topical based linkage score between the input and the corresponding electronic document is determined based on $$\frac{\sum_{i}^{N-1} \text{TopicalSimilarity}_{qi} \cdot c_{id}}{1 + \ln(1 + \text{LinkCount}_d)}$$

where i is an electronic document in the plurality of electronic documents except a focal electronic document d of which the topical based linkage score is to be calculated, $c_{id}$ is a binary variable that denotes a link from electronic document i to electronic document d, TopicalSimilarity$_{qi}$ is the topical similarity score between the input and the electronic document i, N is the total number of electronic document, LinkCount$_d$ is the number of incoming links to electronic document d.

* * * * *